(12) United States Patent
Kusuda

(10) Patent No.: US 6,699,126 B2
(45) Date of Patent: *Mar. 2, 2004

(54) GAME SYSTEM, NETWORK GAME APPARATUS, GAME APPARATUS, CLIENT DEVICE, AND RECORDING MEDIUM

(75) Inventor: Kazuhiro Kusuda, Tokyo (JP)

(73) Assignee: Konami Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/909,970

(22) Filed: Jul. 23, 2001

(65) Prior Publication Data

US 2002/0013175 A1 Jan. 31, 2002

(30) Foreign Application Priority Data

Jul. 21, 2000 (JP) ....................................... 2000-220784

(51) Int. Cl.[7] .............................................. G06F 17/00
(52) U.S. Cl. ............................................ 463/42; 463/6
(58) Field of Search .............................. 463/42, 40, 41, 463/43, 1, 6, 7, 8, 9, 30, 31, 32; 709/205; 273/148 B, 148 R, 460.1, 461

(56) References Cited

U.S. PATENT DOCUMENTS 6,311,041 B1 * 10/2001 Goodyear .................. 434/247

2002/0010023 A1 * 1/2002 Kusuda et al. ................ 463/42

FOREIGN PATENT DOCUMENTS

| JP | 63-242293 A | 10/1988 |
|---|---|---|
| JP | 2-71594 U | 5/1990 |
| JP | 8-829 A | 1/1996 |
| JP | 9-182876 A | 7/1997 |
| JP | 11-19337 A | 1/1999 |
| JP | 11-73091 A | 3/1999 |
| JP | 11-168581 A | 6/1999 |
| JP | 2000-176169 A | 6/2000 |
| JP | 2000-508940 A | 7/2000 |

* cited by examiner

Primary Examiner—Chen Wen Jiang
(74) Attorney, Agent, or Firm—Sughrue Mion, PLLC

(57) ABSTRACT

A game system includes an arcade game machine (1) executing a horse racing game in which a player's own horse runs, and a Web server (20) connected to a player terminal (30) through the Internet. The Web server (20) manages a horse racing game site for performing a training-type horse racing game in which a player using the player terminal can rear and train his or her own horse on the Internet. A player who has obtained a password including ability data and the like of a horse reared in this horse racing game can run the horse in the above horse racing by entering the password into the arcade game machine.

29 Claims, 24 Drawing Sheets

FIG. 4

| ID CODE | |
|---|---|
| PERSONAL INFORMATION | PLAYER'S NAME (NAME ATTACHED IN FRONT OF A HORSE'S NAME), THE TOTAL NUMBER OF PLAYS, ETC. |
| HORSE INFORMATION | NAME CODE, SEX, HORSE TYPE INFORMATION (GROWTH TYPE), AGE, THE NUMBER OF RACES, SPEED, STAMINA, CONDITION, WINNING PRIZE, RECORD OF THE PAST (FIRST, SECOND, NO PRIZE), TRAINING TYPE |
| UPDATE INFORMATION | |
| CHECK CODE | |

FIG. 10

GM HORSERASING GROUND

GM horseracing ground where the horses playing an active part in the *arcade games* compete with each other at a nationwide level.
Which horse is Japan's No.1?!

RACE VIEW

You can enjoy a horse race held in the GM horseracing ground.
Race is held on Fridays at 24:00!

THIS WEEK'S SCHEDULE PAGE

You can view the races scheduled in this week and the introduction of the running horses.
Five races are held in every week!

LAST WEEK'S RESULTS PAGE

You can view the the results of the races held this week.

FIG. 11A

INTERNET GRAND PRIX / OWNER RANKING

| ORDER | OWNER | WINNING PRIZE | RECORD | DISTINGUISHED HORSE | COMMENT |
|---|---|---|---|---|---|
| 1 | Ray | 765 million yen | 15 wins out of 32 races | 8 | four wins toward a championship |
| 2 | Lucky | 680 million yen | 12 wins out of 27 races | 7 | rank up if winning successively |
| 3 | Neo | 646 million yen | 10 wins out of 45 races | 12 | |
| 4 | Simity | 540 million yen | 11 wins out of 26 races | 7 | |
| 5 | Micky | 438 million yen | 8 wins out of 51 races | 13 | |
| 6 | Kinkin | 394 million yen | 7 wins out of 29 races | 8 | |
| 7 | Nice | 360 million yen | 7 wins out of 31 races | 8 | |
| 8 | Blacklist | 349 million yen | 7 wins out of 23 races | 6 | |
| 9 | Mt. Fuji | 321 million yen | 7 wins out of 26 races | 5 | |
| 10 | Green | 309 million yen | 6 wins out of 19 races | 5 | |
| 11 | GM member | 306 million yen | 7 wins out of 18 races | 7 | |
| ... | ... | ... | ... | ... | |
| 30 | Midori | 198 million yen | 3 wins out of 11 races | 6 | |

FIG. 11B

DISTINGUISHED HORSE RANKING (WINNING MONEY) 1ST TO 30TH

| ORDER | HORSE NAME | WINNING MEDAL | LIFETIME RECORD | WINNING RATE | THE NUMBER OF WINS IN GI | GI CHAMPIONSHIP |
|---|---|---|---|---|---|---|
| 1 | Ray Fortune | 8930 | 32 - 15 | .469 | 5 | The Emperor's Prize(spring), Arima Record, Japan Cup |
| 2 | Lucky Silence | 7623 | 27 - 12 | .000 | 5 | Arima Record, Japan Cup |
| 3 | Neo Bryan | 7501 | 45 - 10 | .000 | 4 | Arima Record, Yasuda Record |
| 4 | Simity Prince | 6489 | 26 - 11 | .000 | 5 | The Emperor's Prize(spring), NHK mile, Sprinter S |
| 5 | Ray Prince | 6210 | 51 - 8 | .000 | 3 | Japan Cup |
| 6 | Kinkin Star | 5620 | 51 - 8 | .000 | 4 | Japan Cup, Satsuki Prize, Queen Elizabeth's Prize |
| 7 | Casino Symbol | 5514 | 51 - 8 | .000 | 3 | Derby, Arima Record, Japan Cup |
| 8 | Dragon Palace | 5364 | 51 - 8 | .000 | 3 | Derby, Arima Record, Japan Cup |
| 9 | Mount Thunder | 5147 | 51 - 8 | .000 | 4 | Chrysanthemum Prize, Arima Record |
| 10 | Green Fortune | 5098 | 51 - 8 | .000 | 3 | The Emperor's Prize(spring), Arima Record, Japan Cup |
| 11 | GM Wonder | 5012 | 51 - 8 | .000 | 3 | The Emperor's Prize(spring), Arima Record, Japan Cup |
| ... | ... | ... | ... | ... | ... | ... |
| 30 | Midori Speed | 4150 | 11 - 3 | .273 | 3 | The Emperor's Prize(spring), Arima Record, Japan Cup |

FIG. 11C

DISTINGUISHED HORSE RANKING (RECORD) 1ST TO 30TH

| ORDER | HORSE NAME | RECORD pts. | LIFETIME RECORD | WINNING RATE | THE NUMBER OF WINS IN GI | GI CHAMPIONSHIP |
|---|---|---|---|---|---|---|
| 1 | Muse Raiden | 1147 | 17 - 11 | .647 | 10 | Arima Record, Yasuda Record |
| 2 | Yamazaki Wonder | 1107 | 7 - 6 | .357 | 5 | Arima Record, Japan Cup |
| 3 | Mark Glorious | 978 | 28 - 12 | .428 | 11 | Arima Record, Japan Cup |
| 4 | Asuka Elizabeth | 965 | 13 - 8 | .615 | 7 | The Emperor's Prize(spring), NHK mile, Sprinter S |
| 5 | Hasiru Typhoon | 841 | 23 - 9 | .391 | 9 | The Emperor's Prize(spring), NHK mile, Sprinter S |
| 6 | Side Special | 817 | 30 - 17 | .567 | 5 | Arima Record, Japan Cup |
| 7 | Sun Music | 795 | 11 - 6 | .545 | 5 | Japan Cup, Satsuki Prize, Queen Elizabeth's Prize |
| 8 | Ray Fortune | 719 | 32 - 19 | .469 | 5 | Derby, Arima Record, Japan Cup |
| 9 | Tatsu Silence | 660 | 100 - 11 | .110 | 11 | Derby, Arima Record, Japan Cup |
| 10 | Macho Alpha | 633 | 21 - 7 | .333 | 6 | Derby, Arima Record, Japan Cup |
| 11 | Konami Thunder | 614 | 22 - 8 | .364 | 5 | Chrysnthemum Prize, Arima Record |
| ... | ... | ... | ... | ... | ... | ... |
| 30 | Green Speed | 550 | 10 - 4 | .400 | 3 | The Emperor's Prize(spring), Arima Record, Japan Cup |

RECORD POINT : LIFETIME WINNING RATE x 1000 pts. + THE NUMBER OF WINS IN G1 x 50 pts.

FIG. 12

(a)
| ENTRY REGISTRATION | If you have already done the owner registration, click here. |
| OWNER REGISTRATION | If you join the game for the first time, click here. |

The next race is held on December 7 (Fri).

(b) Click the send button after filling out the necessary items.
e-Mail Address for Contact [123@45678]
Owner Name [OO] (within 8 katakana characters)
PASSWORD [********] (within 8 half-width alphanumeric characters)
[SEND]

(c) Confirm the registration information
Owner Name [OO]
PASSWORD [********]
[SEND]

(d) The registration information has been confirmed.

The record of XX in the Internet Grand Prix
Winning Prize : one billion three hundred and fifty two million yen
The Total Record : 5 wins out of 21 races
Ranking : 23rd / 1289
▼ Championship Race

[Cherry Blossom | Satsuki | The Emperor's Prize (spring) | NHK | Takarazuka Record | Oaks | Derby | Yasuda Record | Takarazuka Record | Shuuka Prize | The Emperor's Prize (autumn) | Chrysanthemum | Elizabeth Prize | Mile CS | Japan Cup | Hanshin Three | Asahi | Sprinter | Arima Record]

You have registered seven horses now.   Click here if adding a distinguished horse →   [OWN HORSE]
XX Bryan                                                                    2/7
Record in the Internet Grand Prix
Record : 1 win out of 3 races        Winning money : fifty five million yen
11/09  Satsuki Prize              5th     two million yen
11/16  Yasuda Record             1st     five million yen
11/30  The Emperor's Prize (spring)  12th   three million yen

[FORWARD] [RETIRE] [RUN] Click if you run the horse.   [NEXT]

(e)
[HORSE REGISTRATION]  Click here if you purchase new horse.
[HORSE SELECTION]     Click here if you run your own horse.

(f) Which race do you want to register in?
(Select one of them.)
○ ○ ○ ○ ○
[Oaks | Derby | Yasuda Record | Takarazuka Record | Shuuka Prize]
The race you can join depends on the number of lifetime winning medals and the G1 championship in the *arcade game* machine.
[SEND]

(g) Distinguished horse : XX Bryan
Password
  asakiyoni okataraha entokino
  kiyayuohi umeomeri masoyuchiku

FIG. 15

RACE VIEW    THE NEXT RACE IS SATSUKI PRIZE

SATSUKI PRIZE DECEMBER 7 (FRI) 24:02 START    PRIZE MONEY : FIFTY MILLION YEN

| | HORSE NAME | OWNER | EXPEC-TATION | ACHIEVEMENT | | | | COMMENT | ODDS |
|---|---|---|---|---|---|---|---|---|---|
| | | | | RECORD | WINNING RATE | THE NUMBER OF WINS IN G1 | | | |
| 1 | XX Bryan | Kusuda | ○ ◎ | 28-8 | .286 | 7 wins | perfect | | 5.6 |
| 2 | Stakoravitch | Tomaru | | 12-7 | .583 | 5 wins | well | | 10.5 |
| 3 | XX Prince | Konami | ◎ ◎ ○ | 17-8 | .471 | 3 wins | slump | | 13.5 |
| 4 | Ray Fortune | Ray | | 8-4 | .500 | 3 wins | the most popular | | 4.2 |
| 5 | Lucky Silence | Lucky | × ▲ | 10-4 | .400 | 2 wins | better condition | | 24.9 |
| 6 | Casino Symbol | Ando | △ × | 24-12 | .500 | 3 wins | smart running | | 35.6 |
| 7 | G1 Classic | Yoshida | | 32-8 | .250 | 5 wins | first challenge | | 12.8 |
| 8 | Neo Alpha | Neo | | 28-8 | .286 | 6 wins | former pace down | | 86.3 |
| 9 | Simity Typhoon | Simity | ○ △ | 16-3 | .188 | 3 wins | win a prize | | 65.0 |
| 10 | Micky Raiden | Micky | | 27-5 | .185 | 7 wins | victory or defeat | | 6.9 |
| 11 | Kinkin Special | Kinkin | | 28-8 | .286 | 3 wins | first challenge | | 58.3 |
| 12 | Nise Glorious | Nise | | 21-9 | .429 | 2 wins | first challenge | | 18.6 |
| 13 | Nomino Heart | Sasaki | | 28-13 | .464 | 5 wins | well | | 8.0 |
| 14 | Black Great | Black | ▲ △ ▲ | 11-5 | .455 | 3 wins | two successive victories | | 23.6 |

FIG. 17

| LAST WEEK'S RESULTS | DECEMBER 7 (FRI) | | | | |
|---|---|---|---|---|---|
| DECEMBER 7 (FRI) SECOND | | | RACE RESULT OF SATSUKI PRIZE | | |
| ORDER | HORSE NUMBER | HORSE NAME | DIFFERENCE | PRIZE MONEY | |
| CHAMPIONSHIP | ① | XX Bryan | | 50 MILLION YEN | |
| SECOND | ⑬ | Nomino Heart | 5 | 20 MILLION YEN | |
| THIRD | ⑩ | Micky Raiden | HEAD | 12.5 MILLION YEN | |
| FOURTH | ② | Stakoravitch | NOSE | 7.5 MILLION YEN | |
| FIFTH | ⑤ | Lucky Silence | NECK | 5 MILLION YEN | |

THE PREVIOUS RACE

THE NEXT RACE

FIG. 19

FILL IN THE DISTINGUISHED HORSE PASSWORD AND THEN CLICK THE OK BUTTON.

DISTINGUISHED HORSE PASSWORD : BANIKUREHA SUKIWATATSU HOKETOKETE AISADARI HIHIROTUNO SEFUNAKORU

| A | B | C | D | E | F | G | H | I | J |
|---|---|---|---|---|---|---|---|---|---|
| K | L | M | N | O | P | Q | R | S | T |
| U | V | W | X | Y | Z |   |   |   |   |

OK

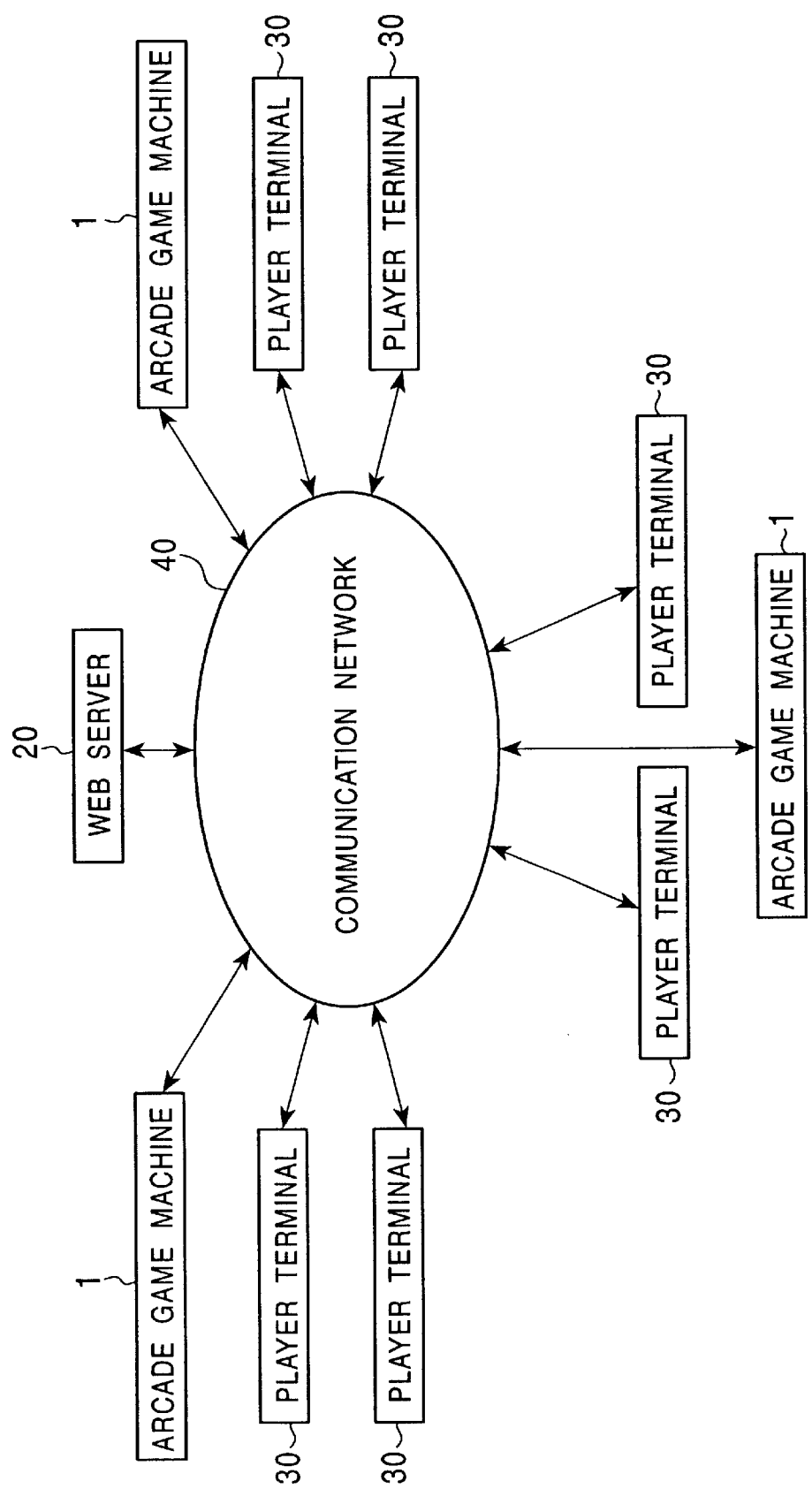

GAME SYSTEM, NETWORK GAME APPARATUS, GAME APPARATUS, CLIENT DEVICE, AND RECORDING MEDIUM

BACKGROUND OF THE INVENTION

1. Field of the Invention

The present invention relates to a game system provided with a network game system connected through a network to a client device used by a player for performing a network game using an object to be trained that the player rears and a game apparatus for executing a game using the above trained object. Further, the present invention relates to a network game apparatus and a game apparatus forming the game system. Further, the present invention relates to a client device connected to this network game apparatus through a network. Furthermore, the present invention relates to a recording medium, such as a computer readable medium, having recorded a program for controlling a computer forming the network game apparatus.

The present application is based on Japanese Patent Application No. 2000-220784, which is incorporated herein by reference.

2. Description of the Related Art

Commercial game apparatuses (hereinafter, referred to as "arcade game machines") include game apparatuses which, for example, execute a game using trained objects which have been reared by individual players. For example, various games are known, such as a training-type horse racing simulation game in which players race their own horses, which are trained objects and have been reared by the players who become as their owners, and a car racing game of running a car race using a racing car as the object, which the player has tuned-up to customize it. On the other hand, with the rapid widespread use of the Internet these days, it is possible for people to gain access to various sites and enjoy network games in these sites that players can participate in.

In recent arcade game machines and domestic game is machines, the image quality has much improved, the game content has become more complex, and the games are performed in a more complicated and sophisticated way. Accordingly, the amount of game information necessary for performing such games becomes enormous. In order to perform these complicated and sophisticated games as network games, it is necessary to perform high-capacity, high-speed data communication between terminals used by the players and a Web server acting as a network game apparatus for performing the network game. A communication infrastructure enabling this high-capacity, high-speed data communication, however, is not so prevalent that the public can make widespread use of it. Therefore, the game content actually realized by network games is more narrowly restricted than dedicated game apparatuses such as arcade game machines, in network game apparatuses, it is difficult to perform games as complicated as those played on arcade game machines and the like.

Even if a high-capacity, high-speed communication infrastructure could be established and hence a complicated and sophisticated game could be realized in a network game, the game content of dedicated arcade game machines, constructed by hardware or software specialized for the game content, would be superior to the above network game.

SUMMARY OF THE INVENTION

In view of the above background, an object of the present invention is to provide a game system which enables game play in a game apparatus such as an arcade game machine and the like, based on training result information which is information on the training result of a trained object which a player has reared in a network game, and enables the player to enjoy a more complicated and sophisticated game by making use of the trained object in the network game: a network game apparatus and a game apparatus forming this game system: and a storage medium readable by a computer, which stores a program for operating a computer forming this network game apparatus.

In order to solve the above problems, according to a first aspect of the present invention, there is provided a game system which comprises:

a network game apparatus connected to a client device used by a player through a network, for executing a network game using a trained object reared by the player; and a game apparatus for executing a game using the trained object, wherein the network game apparatus comprises:

a trained object information recording medium having recorded trained object information including training result information that is information about training result of the trained object; and a trained object information output device which supplies at least one part of the trained object information recorded in the trained object information recording medium to a player who plays the network game, and wherein the game apparatus comprises:

a trained object information receiving device which receives the trained object information from the player;

a training result information reading device which reads out the training result information that is the information about the training result of the trained object, based on the trained object information received by the trained object information receiving device;

a game advancing device which advances the game based on the training result information read out by the training result information reading device; and a game information providing device which provides game information advanced by the game advancing device to the player who is playing the game.

In this game system, a player can pass the trained object information of a trained object reared in a network game apparatus to a game apparatus such as an arcade game machine set in a game center and a domestic game machine at his or her house. A network connecting a client device used by a player to a network game is not restricted to a global network such as the Internet, but it may include an exclusive network allowing communication only for specified persons and a network in a restricted space such as a game center and the like. The trained object information includes the training result information that is the information about the training result in the network game, parameters inherent in a trained object concerned with a game advance such as the name of a trained object, and the personal information relative to a player. This trained object information is supplied by the trained object information output device from the network game apparatus to a player. This trained object information output device may be designed to pass the trained object information from a network to a player through a client device as the electronic data, or to mail to a player, a portable storing medium such as a floppy disk (FD) and the like in which the trained object information is stored as the electronic data. The trained object information thus supplied is passed to a game apparatus such as an arcade game machine and the like by the trained object information receiving device. In this game apparatus, the training result information reading device reads out the training result information of the trained object, based on the received trained object information. This training result information reading device is to read out the training result information, out of the trained object information when the received trained object information includes the training result information, while it is to read out the same information from another place such as a database and the like storing the training result information associated with the trained object information. Thus read out training result information affects a game advance of the trained object in a network game. The game information such as a picture and sound of the game is provided to a player by the game information providing device, thereby enabling a player to play the game. According to the above structure, in this game system, the training result information in a network game is used as parameters inherent in a trained object for use in a game by a game apparatus, thereby enabling the training result that the player reared in a network game apparatus to be reflected in the game by the game apparatus such as an arcade game machine and the like.

According to second to eleventh aspects of the present invention, there is provided a network game apparatus connected through a network to a client device used by a player, for executing a network game using a trained object reared by each player. The network game apparatus comprises:

a trained object information recording medium which stores trained object information including training result information which is information about the training result of the trained object; and a trained object information output device which supplies at least one part of the trained object information stored in the trained object information recording medium to a player who plays the network game.

The network game apparatus of the second aspect enables a game play in a game apparatus such as an arcade game machine and the like, based on the training result information which is the information about the training result of a trained object reared in the same network game apparatus, by using it as the network game apparatus in the game system of the first aspect of the present invention.

According to a third aspect of the present invention, there is provided the network game apparatus according to the second aspect, wherein the trained object information supplied by the trained object information output device includes specifying information for specifying the trained object reared by the player, and wherein the network game apparatus further comprises a training result information output device which supplies the training result information with the same information associated with the specifying information.

When the training result information of a trained object reared by a player includes the detailed parameters, the information amount thereof becomes very large. Assuming that the trained object information output device is to supply the trained object information including the training result information, for example, when the trained object information is displayed by a password, a player must do a work such as noting down the long password and the like in order to pass the password to a game apparatus. When the information is passed to a game apparatus, with it stored in a predetermined portable storage medium, a high capacity storage media becomes necessary, which may cost a player. Therefore, the network game apparatus according to the third aspect of the present invention is designed in that the trained object information supplied to a player includes at least the specifying information for specifying a trained object reared by the player, and that the training result information associated with the specifying information is supplied by the training result information output device separately from the trained object information. This training result information output device includes, for example, a type of sending the training result information to a game apparatus such as an arcade game machine and the like through a network and a type of recording the training result information into a predetermined portable storage medium. In the case of using the training result information output device of recording the same information in a portable storage medium, the portable storage medium may be carried and the content of the portable storage medium may be transferred to the network game apparatus. In these ways, if it is constituted in that the training result information is passed to the network game apparatus regardless of a player, a play has only to pass the trained object information to the device. Therefore, even if the training result information has a large amount of information, the training result information can be reflected in the game by the game apparatus without burdening a player.

According to a fourth aspect of the present invention, there is provided the network game apparatus according to the second aspect, wherein the trained object information supplied by the trained object information output device includes the training result information.

In this network game apparatus, since the trained object information includes the training result information, if only having the trained object information, a player can join in a game by a game apparatus, using the trained object. Accordingly, differently from the network game apparatus according to the third aspect, this network game apparatus don't need to be designed to pass the training result information within the network game apparatus to the game apparatus separately from the trained object information.

According to a fifth aspect of the present invention, there is provided the network game apparatus according to the third or fourth aspect, wherein the training result information is the training result information in a best condition of the training result information stored in the trained object recording medium.

As a training-type game, ability of a trained object used as the training result information is increased with advance of the game in some games, and the ability is decreased in other games. For example, in a training-type horse racing simulation game, some games are designed to deteriorate the ability gradually with aging after a peak of the ability. In a network game apparatus in which the ability is deteriorated during advance of a network game, if the training result information is that one at a point of supplying the trained object information, the trained object a player managed to bring up cannot be used in the best condition for a game by a game apparatus, which may lessen the pleasure. Therefore, the network game apparatus according to the fifth aspect of the present invention supplies the training result information in the best condition of a trained object reared by the network game apparatus. Thus, a player can reflect the training result information in the best condition obtained in the network game apparatus into a game by a game apparatus.

According to a sixth aspect of the present invention, there is provided the network game apparatus according to the second, third, fourth, or fifth aspect, wherein the trained object information output device includes a password output device which supplies a password including the trained object information converted into a character string.

In this network game apparatus, a password including the trained object information converted into a character string is supplied by using the password output device as the trained object information output device. Thus output password is passed to a player through the data communication via a network or by mail, and thereafter, the player enters the password through input device such as an operation button and the like of a game apparatus, so to pass it to the game apparatus.

According to a seventh aspect of the present invention, there is provided the network game apparatus according to the sixth aspect, wherein the password includes a check code associated with the information included in the password.

In this network game apparatus, a check code concerned with the information of a password is included in the password. As the check code, for example, that one obtained by converting the code data indicating the information included in the password into a character string of the arithmetic result obtained by a predetermined arithmetic expression can be used. Thus, by making a password include a check code, it is possible to restrain an invalid password use like a player who doesn't have a password thinks of an arbitrary password and uses it.

According to an eighth aspect of the present invention, there is provided the network game apparatus according to the second, third, fourth, fifth, sixth, or seventh aspect, wherein the trained object information supplied by the trained object information output device includes date information for specifying a date when the trained object information was supplied by the trained object information output device.

In this network game apparatus, the trained object information output device supplies the trained object information including the date information for specifying the date when the trained object information was supplied. Thus, for example, it is possible to define the term of validity when a player can join a game by a game apparatus by using a trained object concerned with the trained object information. With the term of validity set thus, when a player having a trained object whose validity expired plays a game apparatus once again, the player must train a new trained object again in the network game. Accordingly, it is possible to induce a player to resume a play in the network game.

According to a ninth aspect of the present invention, there is provided the network game apparatus according to the second, third, fourth, fifth, sixth, or seventh aspect, wherein the trained object information supplied by the trained object information output device includes serial number information for specifying a serial number of the trained object information supplied by the trained object information output device.

When different players rear the completely same trained object, there is a fear of supplying the same trained object information to the different players. Especially, when the trained object information is supplied by an easy password, since the information amount is restricted, there is a high possibility of supplying the same password to the different players. Therefore, in the network game apparatus according to the ninth aspect of the present invention, the serial number of the trained object information having been supplied in the past from the network game apparatus is specified based on the serial number information. This can prevent from supplying the same trained object information to the different players.

According to a tenth aspect of the present invention, there is provided the network game apparatus according to the second, third, fourth, fifth, sixth, or seventh aspect, wherein the trained object information supplied by the trained object information output device includes date information for specifying a date when the trained object information is supplied by the trained object information output device, and output sequence information in every day for specifying a sequence of the trained object information supplied by the trained object information output device in every day.

In this network game apparatus, the trained object information output device supplies the trained object information including the device information, the date information, and the output sequence information. Based on the date information, it is possible to specify a date when the trained object information has been supplied, in the commercial game apparatus. Based on the sequence information by day, it is possible to specify the order of the trained object information being supplied from the network game apparatus on that day. Therefore, similarly to the case of the ninth aspect of the present invention, even if using the completely same trained object, it is possible to prevent from supplying the same trained object information to the different players.

According to an eleventh aspect of the present invention, there is provided the network game apparatus according to the second, third, fourth, fifth, sixth, seventh, eighth, ninth, or tenth aspect, wherein the trained object information supplied by the trained object information output device includes acquired information acquired by the trained object in an Internet game.

In this network game apparatus, the trained object information output device supplies the trained object information including the acquired information acquired by a trained object in the network game apparatus. This enables the use of the acquired information for a game by a game apparatus such as an arcade game machine and the like. The content of the acquired information varies depending on the game content of the network game apparatus. Concretely, the winning prize and the winning race name are taken as an example of the acquired information in the training-type horse racing simulation game. This acquired information, for example, the winning race name can be used for the entry for a race which imposes a condition of the winning experience in a specified race, in a game apparatus such as an arcade game machine.

According to twelfth to twenty third aspects of the present invention, there is provided a game apparatus forming a game system which comprises a network game apparatus connected to a client device used by a player through a network, for executing a network game using a trained object reared by the player, and a game apparatus for executing a game using the trained object, wherein the network game apparatus comprises a trained object information recording medium having recorded trained object information including training result information that is information about training result of the trained object, and a trained object information output device which supplies at least one part of the trained object information recorded in the trained object information recording medium to a player who plays the network game, and wherein the game apparatus comprises a trained object information receiving device which receives the trained object information from the player, a training result information reading device which reads out the training result information that is the information about the training result of the trained object, based on the trained object information received by the trained object information receiving device, a game advancing device which advances the game based on the training result information read out by the training result information reading device, and a game information providing device which provides game information advanced by the game advancing device to the player who is playing the game, the game apparatus comprising:

a trained object information receiving device which receives, from a player, the trained object information that is the information about a trained object reared in the network game apparatus;

a training result information reading device which reads out the training result information that is the information about the training result of the trained object, based on the trained object information received by the trained object information receiving device;

a game advancing device which advances the game based on the training result information read out by the training result information reading device; and a game information providing device which provides game information advanced by the game advancing device to the player who is playing the game.

This game apparatus is used as the game apparatus in the game system according to the first aspect of the present invention, thereby enabling a game play in the game apparatus such as the arcade game machine and the like, based on the training result information that is the information about the training result of a trained object reared in a network game apparatus.

According to a thirteenth aspect of the present invention, there is provided the game apparatus according to the twelfth aspect, wherein the trained object information includes specifying information for specifying the trained object reared by the player, and wherein the game apparatus further comprises:

a training result information receiving device which receives the training result information that is the information about the training result of the trained object, the training result information being associated with the specifying information;

a training result information recording medium where the training result information is recorded; and a training result information recording storing device which records the training result information received by the training result information receiving device into the training result information recording medium, wherein the training result information reading device reads out the training result information recorded in the training result information recording medium based on the specifying information included in the trained object information received by the trained object information receiving device.

In this game apparatus, the training result information receiving device receives the training result information supplied by the training result information output device of the network game apparatus according to the third aspect of the present invention, and the training result information recording device records the training result information into the training result information recording medium. When the training object information receiving device receives the specifying information included in the trained object information supplied by the trained object information output device of the network game apparatus, the training result information reading device reads out the training result information associated with the specifying information from the training result information recording medium and advances a game based on the training result information. Thanks to this structure, even if the training result information has a large amount of information, the training result information can be reflected in a game by the game apparatus, without burdening a player.

According to a fourteenth aspect of the present invention, there is provided the game apparatus according to the twelfth aspect, wherein the trained object information includes the training result information that is the information about the training result of the training result information, and wherein the game apparatus further comprises:

a training result information recording medium where the training result information is recorded; and a training result information recording device which records the training result information of the trained object information received by the trained object information receiving device into the training result information recording medium, wherein the training result information reading device reads out the training result information recorded in the training result information recording medium.

In this game apparatus, the trained object information receiving device receives the trained object information from the network game apparatus according to the fourth aspect of the present invention, and the training result information recording device stores the training result information within the training result information included in the trained object information, into the training result information recording medium. The training result information reading device reads out the training result information from the training result information recording medium, so to advance a game based on the training result information. In the game apparatus according to the thirteenth aspect of the present invention, it is necessary to provide with a structure of receiving the training result information from the network game apparatus separately from the trained object information. This game apparatus according to the fourteenth aspect of the present invention, however, doesn't need this structure.

According to a fifteenth aspect of the present invention, there is provided the game apparatus according to the twelfth, thirteenth, or fourteenth aspect, wherein the training result information is the training result information in a best condition in the network game apparatus.

In this game apparatus, the training result information in the best condition in a network game can be used to perform a game. In this game apparatus, when the training result information is received from the network game apparatus according to the fifth aspect of the present invention, the training result information can be used as it is, because the training result information is that one in the best condition. While, when the training result information is received from a network game apparatus that is not the commercial game apparatus according to the fifth aspect of the present invention, if the training result information (history information) of the past is included in the training result information, the training result information in the best condition in the past can be read out based on the history information, and this training result information can be used to perform a game.

According to a sixteenth aspect of the present invention, there is provided the game apparatus according to the twelfth, thirteenth, fourteenth, or fifteenth aspect, wherein the trained object information receiving device includes a password receiving device which receives a password including the trained object information converted into a character string, and wherein the game apparatus further comprises a password decoding device which decodes the password received by the password receiving device so as to obtain the trained object information included in the same password is provided.

In this game apparatus, the trained object information receiving device receives a password supplied from the network game apparatus according to the sixth aspect of the present invention, and the password decoding device decodes the password so to obtain the trained object information.

According to a seventeenth aspect of the present invention, there is provided the game apparatus according to the sixteenth aspect, wherein the password includes a check code associated with the information included in the same password, and wherein the game apparatus further comprises a password determining device which determines whether the information included in the same password is correct information or not, based on the check code obtained through decoding by the password decoding device.

This game apparatus determines whether the information included in the password is correct information or not, based on the check code included in the password supplied by the network game apparatus according to the seventh aspect of the present invention. For example, when the check code is obtained by converting the code data indicating the information included in the password into a character string of the arithmetic result calculated by a predetermined arithmetic expression, the validity of the information can be determined by a coincidence by comparison between the code data obtained through inverse calculation by the arithmetic expression with the code data of various information corresponding to this. Thus, a check code is included in a password, so as to determine whether the password information is correct information or not, thereby restraining an invalid use of a password, like a player having no password uses an arbitrary password to join in a game by the game apparatus.

According to an eighteenth aspect of the present invention, there is provided the game apparatus according to the twelfth, thirteenth, fourteenth, fifteenth, sixteenth, or seventeenth aspect, the game apparatus further comprising:

an entry application receiving device which receives an entry application to the effect that a player wants to join the game; and an entry deciding device which decides an entry for the game based on the entry application when the player satisfies predetermined entry conditions.

In this game apparatus, the entry application receiving device receives an entry application from a player and the entry deciding device makes a decision to permit the player to join the game using the training result information of the trained object when the player satisfies predetermined entry conditions. The entry conditions vary depending on the game content and the purpose of an entry regulation, and concretely, the number of applicants to be admitted, the number of plays in a network game apparatus, or ability based on the training result information of a trained object, is taken as an example of the entry condition.

According to a nineteenth aspect of the present invention, there is provided the game apparatus according to the eighteenth aspect, wherein the trained object information includes date information for specifying a date when the trained object information is supplied, and wherein the entry deciding device decides the entry for the game based on the entry application, when the date information included in the trained object information received by the trained object information receiving device satisfies the entry condition of having the predetermined date information.

When the date information included in the trained object information is the predetermined date information that is the predetermined entry condition, this game apparatus makes a decision to permit a player to join a game using the training result information of the trained object. Namely, when the date information within a specified range is included in the received trained object information, it makes a decision of entry. Therefore, for example, the term of validity in which a player can join in a game using the trained object concerned with the trained object information is fixed, and an entry of a trained object out of the validity can be rejected. This can induce a player to resume a play in the game apparatus.

According to a twentieth aspect of the present invention, there is provided the game apparatus according to the eighteenth or nineteenth aspect, wherein the entry deciding device decides the entry for the game, based on the entry application, when the trained object concerned with the trained object information received by the trained object information receiving device satisfies the entry condition that the trained object is not the same as a trained object which has already joined the game.

When the trained object information concerned with an entry application is the same as that of the trained object which has already joined an applied race, this game apparatus can reject the entry for the game. This can prevent from an overlap entry of the same trained object for the same game.

According to a twenty first aspect of the present invention, there is provided the game apparatus according to the eighteenth, nineteenth, or twentieth aspect, wherein the entry deciding device decides the entry for the game based on the entry application when the player concerned with the entry application received by the entry application receiving device satisfies the entry condition that the player is not the same as a player who has already joined the network game.

When a player who applied for an entry is the same as a player who has already joined the applied game, this game apparatus can reject the entry for the game. This can prevent from an overlap entry of the same player for the same game. When privilege is given to a champion of a game in this game apparatus, there may occur such a situation that one player has a monopoly in a game in order to get the privilege. This game apparatus, however, can prevent from this unfairness.

According to a twenty second aspect of the present invention, there is provided the game apparatus according to the twelfth, thirteenth, fourteenth, fifteenth, sixteenth, seventeenth, eighteenth, nineteenth, twentieth, or twenty first aspect, wherein the trained object information includes the acquired information acquired by the trained object in the network game, and wherein the game advancing device makes use of the acquired information in the game.

This game apparatus can make use of the acquired information acquired in a network game for a game in the same game apparatus. Use of this acquired information varies depending on the game content of the game apparatus. For example, when the game and the network game are both a horse racing simulation game, the winning prize and the number of the winning medals that is the acquired information obtained in the network game may be used as a parameter for enhancing the ability of a trained object for use in this game apparatus.

According to a twenty third aspect of the present invention, there is provided the game apparatus according to the twelfth, thirteenth, fourteenth, fifteenth, sixteenth, seventeenth, eighteenth, nineteenth, twentieth, twenty first, or twenty second aspect, wherein the game advancing device includes:

a training device which trains a trained object particular to a player who joins the game; and an initial training result information deciding device which decides initial training result information before training the trained object for use in the game, based on the training result information according to the trained object information received by the trained object information receiving device.

In this game apparatus, the initial training result information deciding device decides the initial training result information of a trained object used for a game in the same game apparatus, based on the training result information in a network game apparatus, thereby making it possible to perform a training-type game of training the trained object by the training device. Accordingly, for example, as for a trained object having higher ability than that of the other players as the result of the training in a network game, the initial training result information of the trained object for use in this game apparatus can be enhanced more than that of the other players, based on the training result information, thereby enabling differentiation among the respective trained objects. The game apparatus according to the twelfth to twenty second aspects of the present invention as mentioned above doesn't need to be a training-type game necessarily.

According to a twenty fourth aspect of the present invention, there is provided a client device connected through a network to the network game apparatus according to the second, third, fourth, fifth, sixth, seventh, eighth, ninth, tenth, or eleventh aspect, the client device comprising:

a game information receiving device which receives game information of a network game performed by the network game apparatus;

a game information providing device which provides a player with the game information received by the game information receiving device;

a trained object information receiving device which receives the trained object information that is the information about the trained object reared in the network game apparatus; and a trained object information output device which supplies the trained object information received by the trained object information receiving device.

The client device is connected through a network to the network game apparatus according to the second, third, fourth, fifth, sixth, seventh, eighth, ninth, tenth, or eleventh aspect of the present invention. A player receives the game information of a network game performed in the network game apparatus, from the game information receiving device, and the received game information is provided to the player as a game screen, sound, and the like by the game information providing device. Accordingly, this client device can play a network game to be performed by the network game apparatus.

According to a twenty fifth aspect of the present invention, there is provided a recording medium, such as a computer readable medium, having recorded a program for operating a computer included in the network game apparatus according to the second, third, fourth, fifth, sixth, seventh, eighth, ninth, tenth, or eleventh aspect, wherein the program comprises:

a trained object information output routine for supplying, to a player who plays the network game, at least one part of the trained object information recorded in the trained object information recording medium having recorded the trained object information including the training result information that is the information about the training result of a trained object reared by each player.

The program stored in this computer readable medium is run by a computer forming the network game apparatus according to the second, third, fourth, fifth, sixth, seventh, eighth, ninth, tenth, or eleventh aspect of the present invention, thereby enabling a game play in a game apparatus such as an arcade game machine and the like, based on the training result information that is the information concerned with the training result of a trained object reared in the same network game apparatus.

According to a twenty sixth aspect of the present invention, there is provided a recording medium, such as a computer readable medium, having recorded a program for operating a computer included in the game apparatus according to the twelfth, thirteenth, fourteenth, fifteenth, sixteenth, seventeenth, eighteenth, nineteenth, twentieth, twenty first, twenty second, or twenty third aspect, wherein the program comprises:

a training result information reading routine for reading out the training result information that is the information about the training result of the trained object, based on the trained object information received by the trained object information receiving device for receiving from a player the trained object information that is the information about the trained object reared in the network game apparatus; and a game advancing routine for advancing the game, based on the training result information read out by the training result information reading routine.

The program stored in this storage medium is run by a computer forming the game apparatus according to the twelfth, thirteenth, fourteenth, fifteenth, sixteenth, seventeenth, eighteenth, nineteenth, twentieth, twenty first, twenty second, or twenty third aspect of the present invention, thereby enabling a game play in the above game apparatus such as an arcade game machine and the like, based on the training result information that is the information concerned with the training result of a trained object reared in a network game apparatus.

BRIEF DESCRIPTION OF THE DRAWINGS

The above and other objects and advantages of the present invention will become more apparent by describing in detail preferred embodiments thereof with reference to the accompanying drawings, wherein:

FIG. 4 is a view for use in describing a data structure of player data stored in a database ROM of the above Web server;

FIG. 10 is a schematic view showing a horse racing ground page of the above horse racing game site;

FIGS. 11A to 11C are schematic views respectively showing a ranking list open to the public on a ranking page of the above horse racing game site;

FIG. 12(a) is a schematic view showing an initial screen of the entry registration page of the above horse racing game site;

FIG. 12(b) is a schematic view showing an owner registration screen of the above entry registration page;

FIG. 12(c) is a schematic view showing a registration confirmation screen of the above entry registration page;

FIG. 12(d) is a schematic view showing an entry registration screen of the above entry registration page;

FIG. 12(e) is a schematic view showing a horse information screen on the above entry registration screen;

FIG. 12(f) is a schematic view showing an entry race selection screen on the above entry registration screen;

FIG. 12(g) is a schematic view showing a retire screen on the above entry registration screen;

FIG. 15 is a schematic view showing a race information screen shown on a race viewing page of the above horse racing game site just before start of a race;

FIG. 17 is a schematic view showing a race result display screen shown at the above race viewing page just after the end of the race;

FIG. 19 is a schematic view showing a password input screen shown in the above display;

FIG. 21 is a schematic view showing the whole game system according to a second embodiment.

DETAILED DESCRIPTION OF THE PREFERRED EMBODIMENTS

1. First Embodiment

Hereinafter, a description will be given of the embodiment (hereafter, referred to as a first embodiment) in the case of adopting the present invention in a game system in which a player who participates in an Internet horse racing game (hereafter, referred to as "Internet Grand Prix") that is a network game on a public horse racing game site on the Internet can become the owner of a horse in order to rear the horse, which is a trained object, and use the horse for a horse racing simulation game in an arcade game machine acting as a game apparatus, that is, to run the horse in the race.

At first, the overall structure of the game system in accordance with the embodiment will be described.

Figure 2:
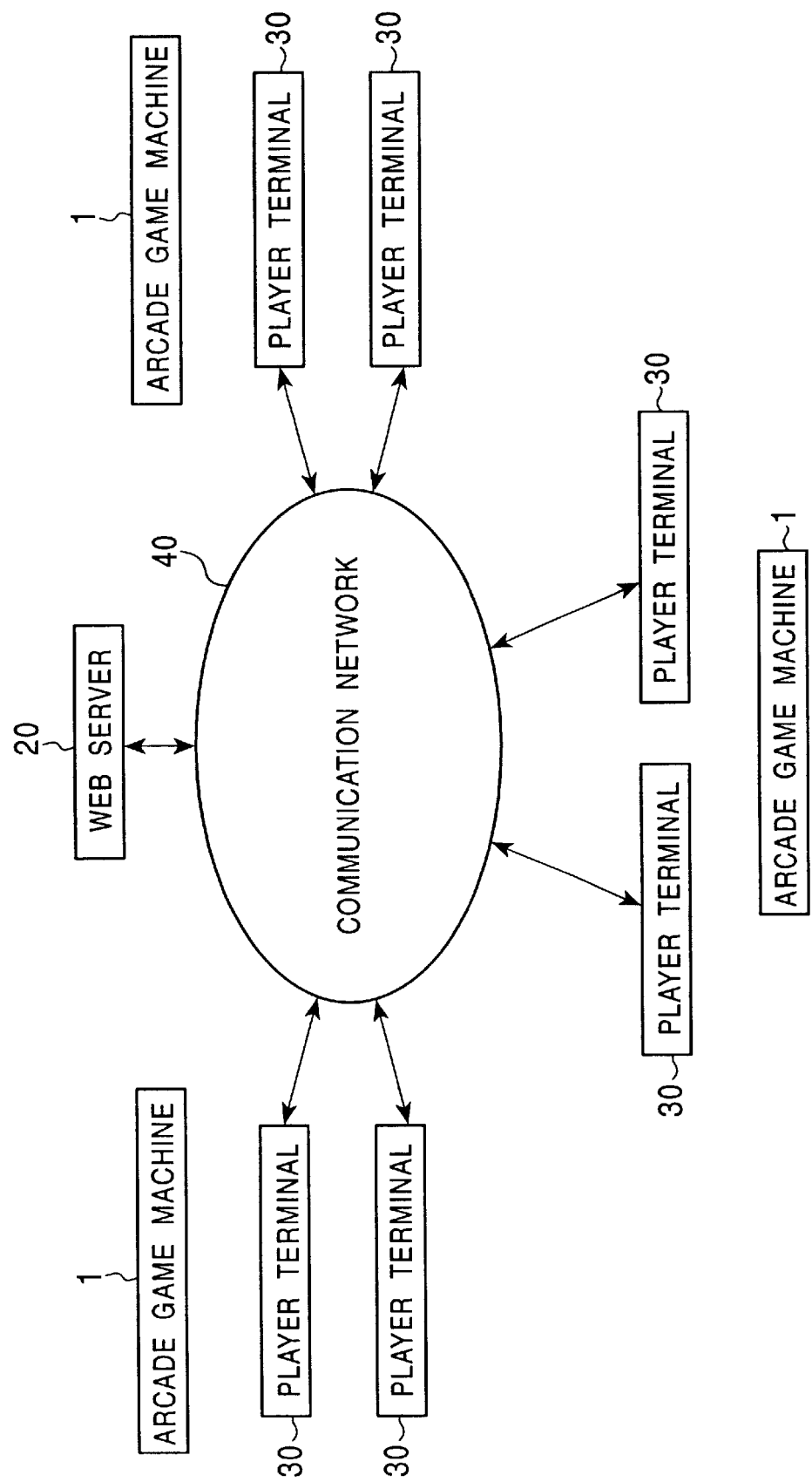
FIG. 2 is a schematic view of the whole game system.

FIG. 2 is a schematic structural view of the overall game system in accordance with this embodiment. This game system comprises many arcade game machines 1 provided in game centers and the like all over the country, a Web server 20 as a network game apparatus for controlling and managing the horse racing game site and performing the Internet Grand Prix held at that site, and player terminals 30 which are individual client devices that are connectable to the Internet. The player terminals 30 can be connected to the Web server 20 through a communication network 40 formed by a public telephone line, a dedicated telephone line, a cable television line, a wireless communication line, or the like forming a network, and it can gain access to the horse racing game site which is open to the public on the Internet through the Web server 20 by using a predetermined browser. Various data to be transferred between the Web server 20 and the player terminals 30 is in the form of computer data signals embodied in predetermined carrier waves, which are transferred through the communication network 40 which acts as a transmission medium.

2. Structure of the Web Server 20

The structure of the Web server 20 forming the above game system will now be described.

Figure 3:
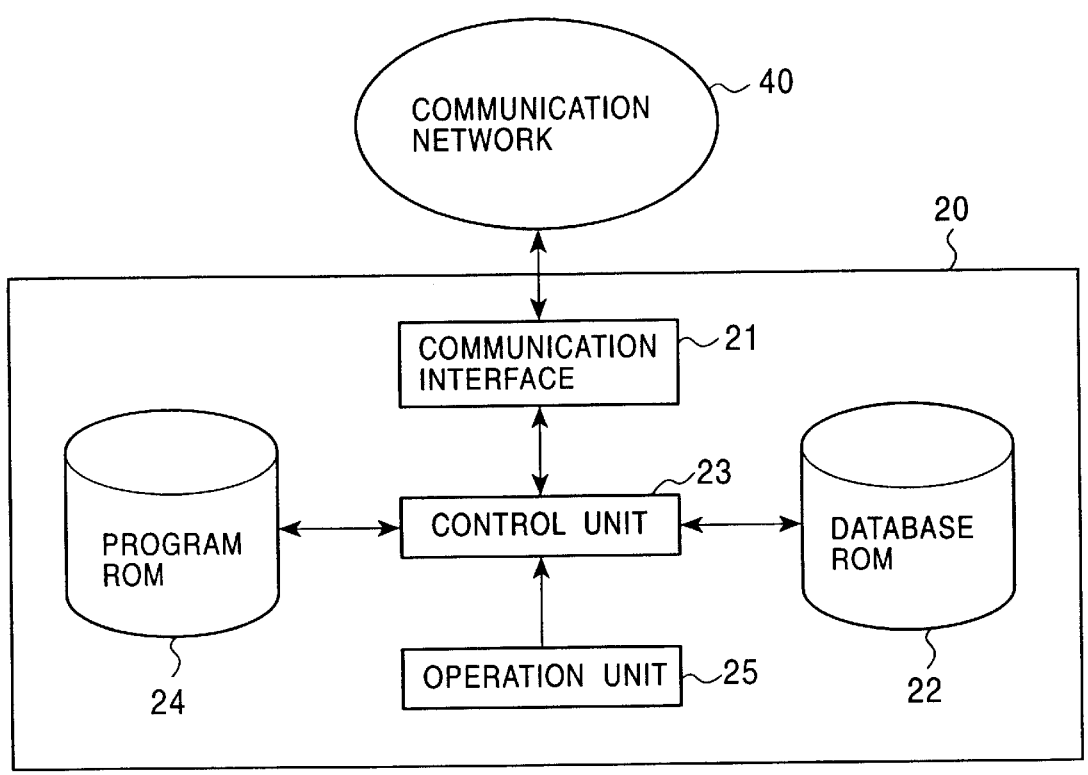
FIG. 3 is a block diagram showing a schematic structure of a Web server forming the above game system.

FIG. 3 is a block diagram showing the schematic structure of the above Web server 20. This Web server 20 comprises a communication interface 21 that is a password output device acting as a trained object information output device formed by a terminal adaptor or the like for sending and receiving data through the above communication network 40, a database ROM (i.e., Read Only Memory) 22 for storing various databases, a control unit 23 for controlling each unit of the above Web server 20, a program ROM 24 which is a storage medium where a program executed by the control unit 23 is stored, and an operation unit 25 operated by an operator or the like. A general-purpose computer or a workstation may be used as this Web server 20: alternatively, a part of the Web server may be controlled and managed by a specialist vender.

FIG. 4 is an explanatory view showing the data structure of player data which is information on the trained object recorded and controlled for every player and which is stored in the above database ROM 22. This player data includes an ID code assigned to every player, personal information about the player, horse information on the player's horse, rewrite information for recording updates to the data, and so on. Further, this player data may include information on the history and the state of the game. The ID code is a unique number assigned to only one player in order not to overlap with the number of another player. This player data is received from the player terminal 30 described later, and is registered in an owner registration database of the database ROM 22 according to a predetermined operation.

The personal information includes information on an individual player such as the player's name, the total number of plays, and the like. This personal information is used not only as data which is reflected in the game content, such as a player's name which is attached in front of his or her own horse's name, but also as customer management data.

The horse information includes a horse name code for specifying the name of the player's horse, horse type information for specifying a growth curve indicating the growth characteristics, sex, age, number of races, speed, stamina, condition, accumulated amount of prize money, record of each past race (for example, first prize, second prize, no prize), and the like. The horse name code is associated with each horse name data within the database of the horse name data stored in the above ROM 22, and based on the horse name code, the horse name data is read out and used in the game. When a player owns a plurality of horses and one ID code has a plurality of horse name codes, the horse name codes should be set at various numbers so as not to overlap with each other.

The above database ROM 22 stores the database with various information as well as the above player data stored therein, the race schedule of the Internet Grand Prix, and the like. This database ROM 22 may be formed by the same ROM as the program ROM 24.

The program ROM 24 stores various programs executed by the control unit 23, and various programs are read out in response to an instruction from the control unit 23. The program ROM 24 stores a game executable program for performing the Internet Grand Prix held at this site, a communication program for sending and receiving data through the communication network 40, and other programs necessary for the processing in the Web server 20, in addition to a site management program for controlling and managing the horse racing game site.

The control unit 23 is formed by at least one computing element such as a CPU (i.e., Central Processing Unit) and a RAM (i.e., Random Access Memory) for temporarily storing program data and the like, so as to activate and control the Web server 20 by reading out a predetermined operating system (OS) stored in the program ROM 24. The control unit 23 executes various programs stored in the program ROM 24 to perform the processing according to the respective programs. A plurality of computing elements, such as CPUs, for executing various programs may be provided therein so to share the execution processing of various programs among the respective computing elements.

3. Structure of the Player Terminal 30

This time, the structure of the player terminal 30 forming the above game system will be described.

Figure 5:
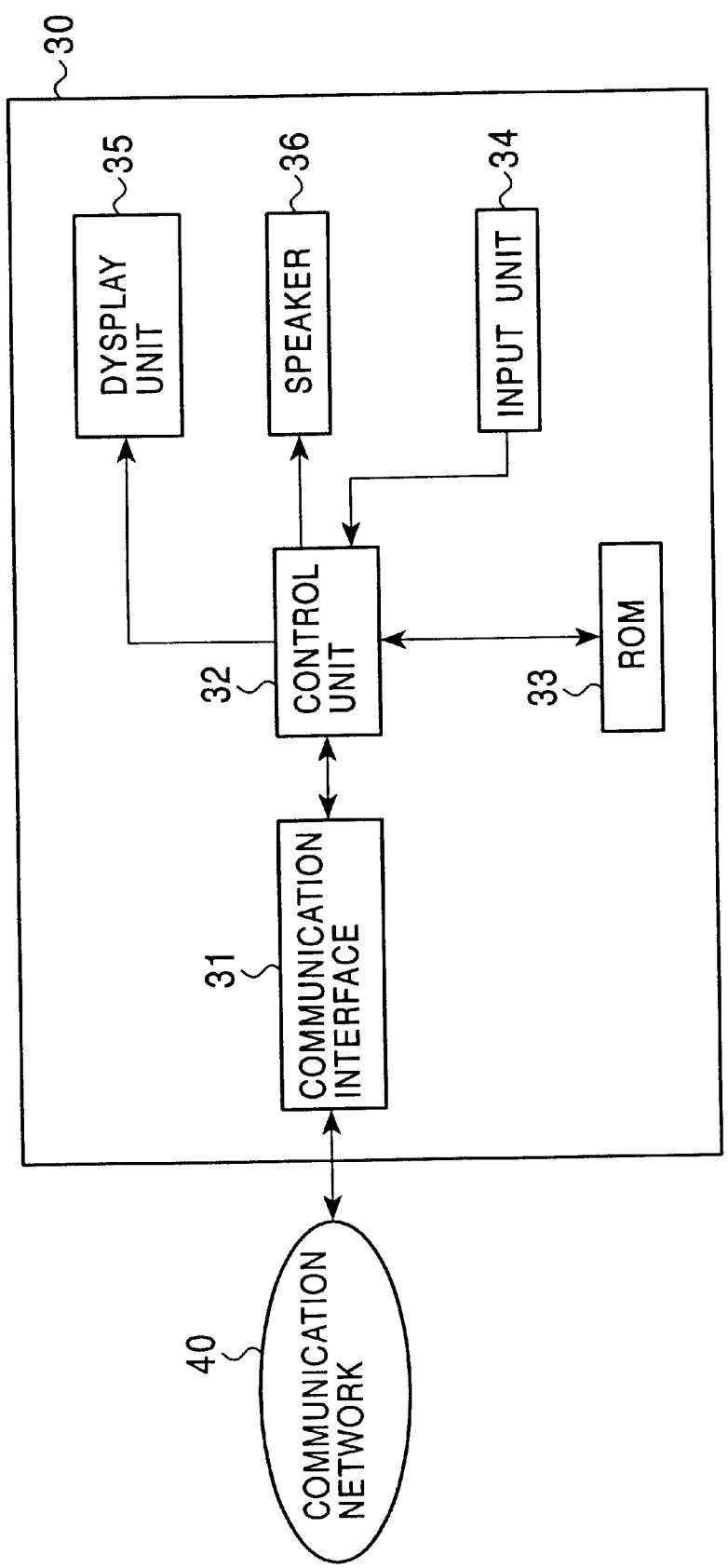
FIG. 5 is a block diagram showing a schematic structure of a player terminal forming the above game system.

FIG. 5 is a block diagram showing the schematic structure of the player terminal 30. The player terminal 30 is a terminal for obtaining access to the horse racing game site managed by the Web server 20 so as to provide a player with various information which is open to the public on this site, and to enter a player in the Internet Grand Prix held at the site. As this player terminal 30, a general-purpose personal computer, which is in widespread use in the home, may be used: alternatively, a home game machine, a household electrical appliance such as a television set, or a mobile communication device such as a portable telephone and the like may be used, as long as it can connect with the Internet and get access to the horse racing game site so as to perform the necessary operations and processing.

This player terminal 30 comprises a communication interface 31, as a trained object information receiving device and a game information receiving device, formed by a terminal adaptor and the like for sending and receiving data through the communication network 40: a control unit 32 for controlling each unit: a ROM 33 with a program to be executed by the control unit 32 stored therein: an input unit 34 operated by a player for receiving various requests: a display unit 35 forming a game information providing device for displaying the image data obtained from the Web server 20 and other display data: and a speaker 36 forming a game information providing device for supplying sound data obtained from the Web server 20 and other audio data. Although the input unit 34 is formed by a keyboard and a mouse in this embodiment, a game input device such as a joystick and the like may be used instead. Further, instead of the speaker 36, headphones or earphones may be used.

The above ROM 33 stores a communication program for accessing the horse racing game site managed by the Web server 20, a browsing program for viewing various public information at the site, and so on. Various programs stored in this ROM 33 are executed by the control unit 32. As the browsing program, browsing software (browser) available on the market or built-in browsing software may be used.

The control unit 32 has the same structure as the control unit 23 of the Web server 20, and it activates and controls the player terminal 30 by reading the OS stored in the ROM 33. Further, the control unit 32 executes various programs stored in the ROM 33 so as to perform processing according to the respective programs.

4. Structure of the Arcade Game Machine 1

Figure 6:
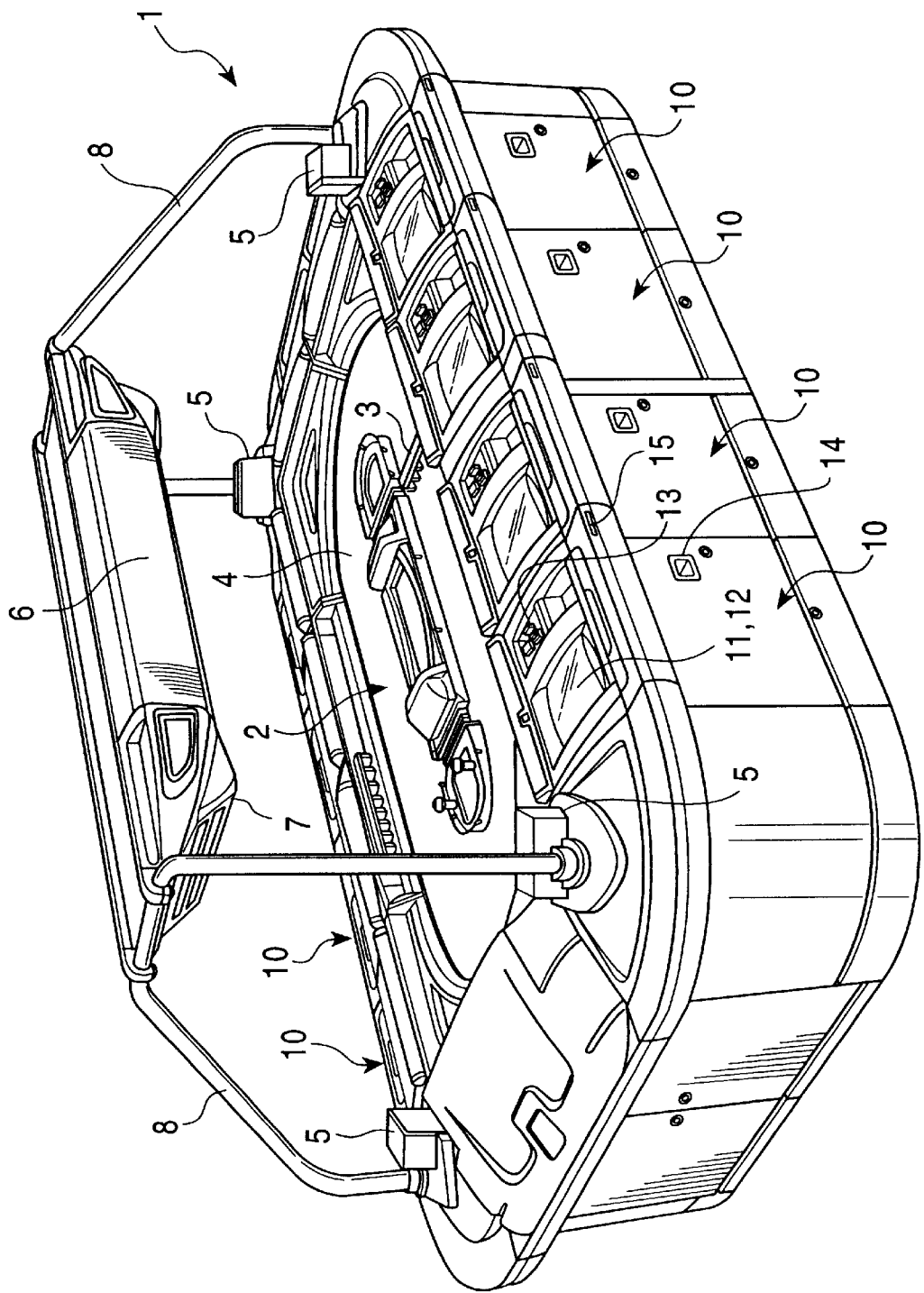
FIG. 6 is a view showing the appearance of one example of an arcade game machine forming the above game system.

FIG. 6 is a view showing the appearance of one example of the arcade game machine 1. The arcade game machine 1 comprises a field 2 provided in the central portion and a plurality of stations 10 provided around the field 2. A race course 4 of the horse racing stadium having a starting gate 3 is provided on the field 2, where a race is performed by running a plurality of model horses (not illustrated) on the race course 4. A plurality of speakers 5 for broadcasting the actual state of the race and cheers are provided around the field 2. A display unit 6 for displaying the title of the game and the like and an illumination device 7 for illuminating the field 2 are disposed over the field 2. These display unit 6 and illumination device 7 are supported by supporting poles 8.

A display 11 as a game information providing device for displaying a game screen depending on the progress of the game and a touch panel 12 forming a password receiving device as a trained object information receiving device which is superimposed on the display screen of this display 11 are provided at each of the stations 10. When a player touches a predetermined position on the game screen displayed on the display 11 according to an instruction on the game screen, the position is detected by the touch panel 12, and the arcade game machine 1 recognizes the operation of the player. A medal inlet 13 into which the player inserts medals, a medal outlet 14 for returning medals to the player, and a magnetic card insertion slot 15 for inserting a magnetic card as a portable storage medium which can store the trained object information in a portable way are provided at each of the stations 10.

In the arcade game machine 1, sequentially races with the same titles as those of the actual Japan Racing Association are held according to a predetermined order, under the control of a main control unit for executing a game advancing program as a game advancing device, as described later. About 60 races are prepared for one year, and the time for betting some medals or purchasing a betting ticket, the time when a race by model horses is held, and the time for displaying the race result are predetermined in every race. A player can predict the order of arrival in every race and purchase a betting ticket at will. This purchase of a betting ticket is done by betting some medals, and if the purchased betting ticket agrees with the race result, a number of medals depending on the number of medals bet and the odds is paid back as a dividend.

Further, in the arcade game machine 1, a player can participate in a game as a horse owner. Here, a player can select a favorite horse from a plurality of prepared racing horses, and pay a predetermined number of medals for the horse to purchase it. The name of the purchased horse is created by combining the name selected from names registered previously in the arcade game machine itself with a player name input by the player (for example, the name of the player). A player can train and rear the purchased horse so as to enhance the ability of the horse. Further, a player can run the horse which the player reared in his or her desired race. The purchase and training of the horse will be described later. Further, in the arcade game machine 1, in order to maintain the continuity of the game when the player participates in the game as a horse owner, the player can resume the game on another day by using a magnetic card supplied to the player.

Figure 7:
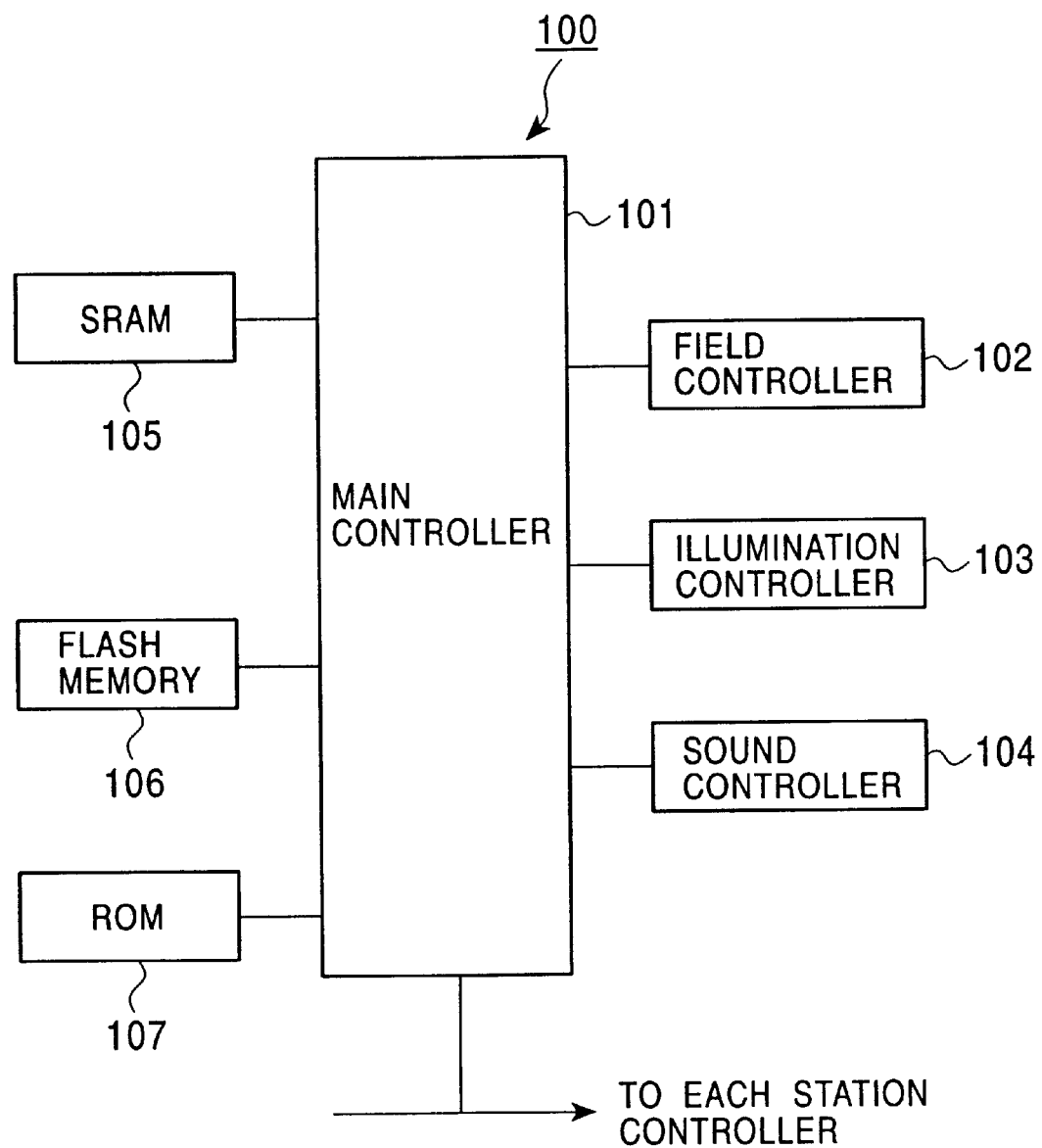
FIG. 7 is a control block diagram showing a main control unit of the above game machine.
Figure 8:
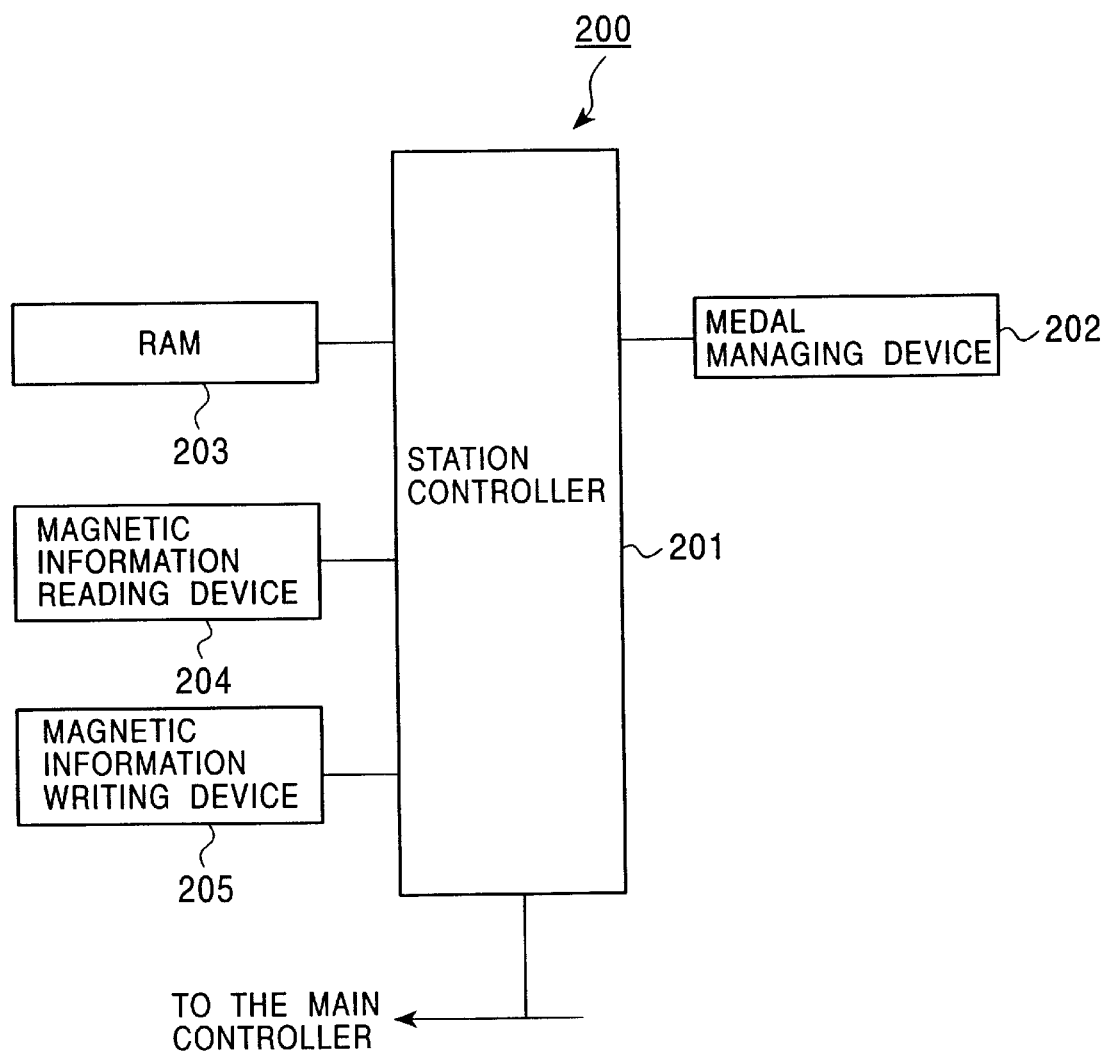
FIG. 8 is a control block diagram showing a station control unit of the above arcade game machine.

FIG. 7 is a control block diagram showing the main control unit for controlling the overall operation of the arcade game machine 1, and FIG. 8 is a control block diagram showing a station control unit provided in each station 10.

As illustrated in FIG. 7, the main control unit 100 provided beside the field 2 comprises a main controller 101, a field controller 102 for controlling the running of the model horses on the field 2, an illumination controller 103 for controlling the illumination device 7, a sound controller 104 for controlling cheers and actual commentary broadcasted through the speakers 5, an SRAM (i.e., Static Random Access Memory) 105 and a flash memory 106 as a storage medium of the training result information for storing various data for each player, and a ROM 107 with a program necessary for the game and various databases stored therein. The main controller 101 is connected to each of the field controller 102, the illumination controller 103, the sound controller 104, the SRAM 105, the flash memory 106, and the ROM 107. In the ROM 107, a database including the horse name data with various kinds of names stored in advance which are selected by the player, the sound data thereof, various data on each horse, race schedules, and the like is stored.

As illustrated in FIG. 8, the station control unit 200 provided at each station 10 comprises a station controller 201, a medal managing device 202 for managing return of medals, a RAM 203 for temporarily storing various player data, a magnetic information reading device 204 for reading magnetic information on a magnetic card inserted into the magnetic card insertion slot 15, and a magnetic information writing device 205 for writing various information such as the ID code and the like into the magnetic card. The station controller 201 is connected to each of the medal managing device 202, the RAM 203, the magnetic information reading device 204, and the magnetic information writing device 205. Further, the station controller 201 is connected to the display 11 and the touch panel 12 provided at each station 10, as shown in FIG. 6, a medal sensor (not illustrated) for detecting a medal inserted into the medal inlet 13, and a magnetic card driving device (not illustrated) for driving the magnetic card inserted into the magnetic card insertion slot 15.

Further, as illustrated in FIG. 7 and FIG. 8, the station controller 201 at each station 10 is connected to the main controller 101 at the field 2, thereby enabling the necessary communication between them.

In the RAM 105 and the flash memory 106, player data recorded and managed for every player is stored. This player data is the same information as the player data in the Web server 20, however, this includes information on the date of the last play for specifying the date when the player last played the game, and information such as a check code for the purpose of preventing the magnetic card from being tampered. Further, this player data also includes information on the history and the state of the game, and the screen layout information regardless of the game progress. The ID code in this player data is a unique number assigned to only one player and it is set so as not to be the same as that of the player data of another player of the Internet Grad Prix performed by the Web server 20. The personal information, the horse information, and the last play date information are used as the game history to ensure continuity of an interrupted game.

When a player interrupts the game, a part of the player data is recorded in the write data to be written in the magnetic card. More concretely, the ID code, the check code, and the screen layout information regardless of the game progress are recorded.

When a player wants to resume the game in the arcade game machine 1, the player inserts the magnetic card into any station 10. Thus, the check code recorded in the magnetic card is read out, and after checking the validity of the information written there, the ID code recorded in the magnetic card is read out. The player data corresponding to this ID code is read out from the flash memory 106 shown in FIG. 7. The read player data is written into the RAM 203 of the station 10, as shown in FIG. 8, and is used for predetermined processing. Thus, a player can resume a game anytime by using a magnetic card, and can enjoy the game by continuously using the horse which the player has reared.

5. Overall Flow of the System

Here, a description will be made of the flow starting from a player rearing his or her own horse in the Internet Grand Prix to a player racing the horse in the arcade game machine 1 after reflecting various ability data as the training result information of the horse in the game in the arcade game machine 1, by use of the above game system.

Figure 1:
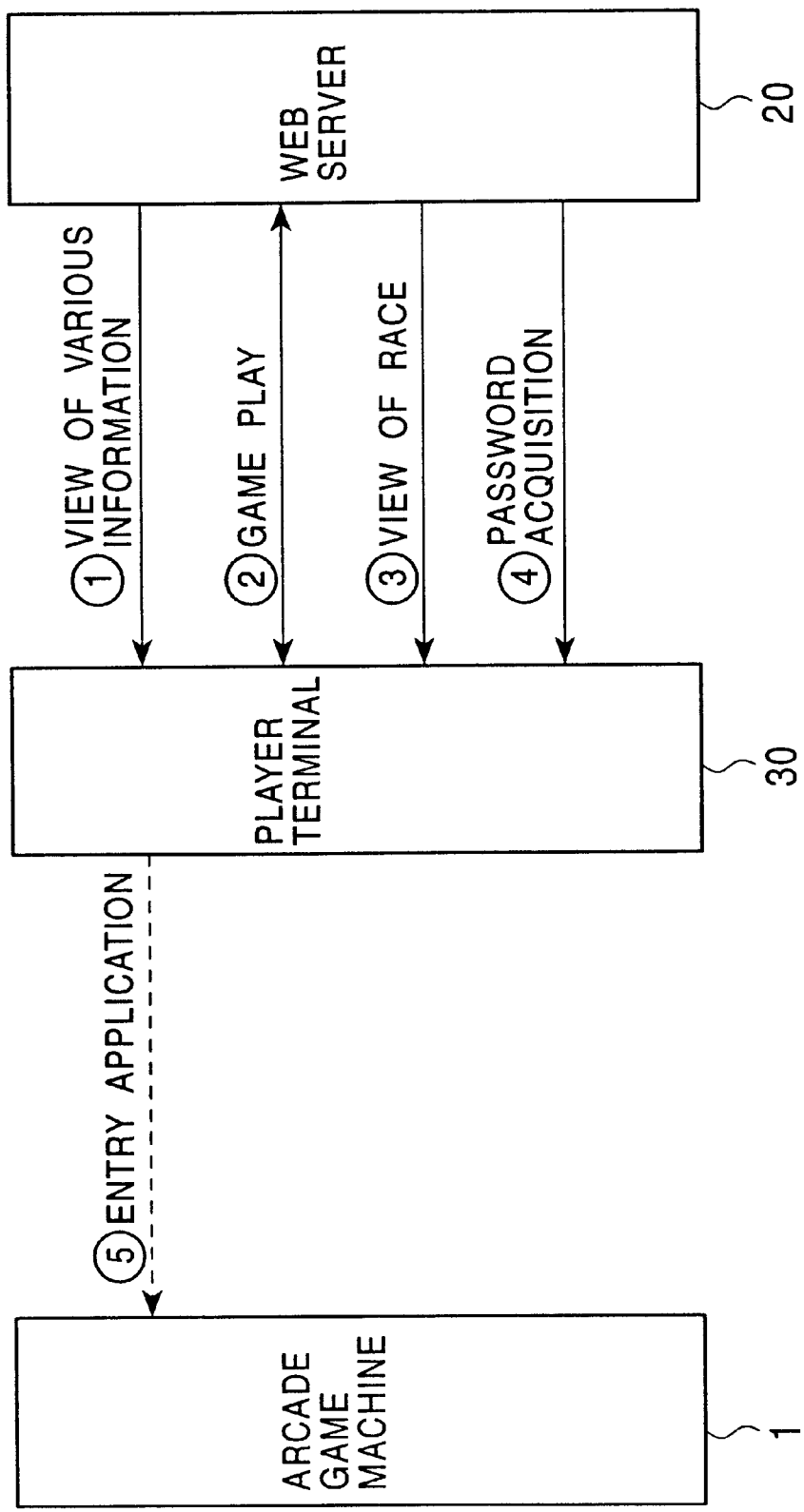
FIG. 1 is a view for describing a flow of a game system according to a first embodiment of the present invention.

FIG. 1 is an explanatory view showing the flow of the game system in accordance with the embodiment form. In the game system, a player can access the horse racing game site to view various information on the site (Step 1). Further, a player can play the role of a horse owner in the Internet Grand Prix executed by the Web server 20 and run his or her own reared horse in a race (Step 2). Further, a player can watch a race in which the player's own horse runs (Step 3). If the horse satisfies predetermined conditions in the Internet Grand Prix, a player can get a password such that one part of the player data that is the trained object information is replaced with a character string (Step 4). A player who obtains the password can apply for various races held in the arcade game machine 1, by using the password (Step 5).

6. Viewing of Various Information: Step 1

A player can access a horse racing game site managed by the Web server 20, using, for example, a personal computer at his or her house as the player terminal 30.

Figure 9:
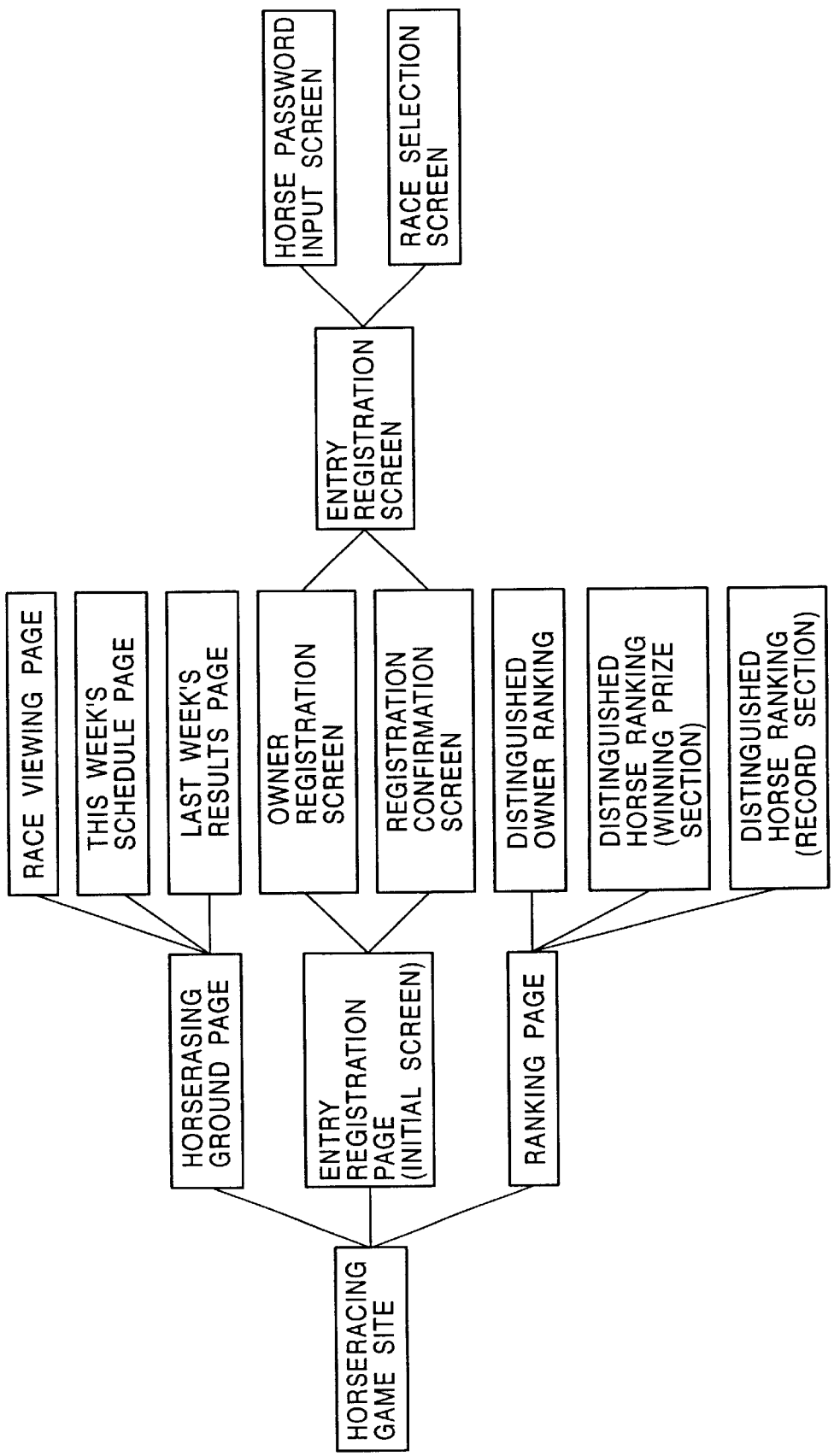
FIG. 9 is a view for use in describing a site structure of a horse racing game site managed by the above Web server.

FIG. 9 is an explanatory view showing the site structure of the horse racing game site. In the horse racing game site, there are a horse racing ground page where a player can watch a race and read the race schedule, the past race results, and the like, an entry registration page for registering an entry for a race by applying for a race by use of a password, and a ranking page for displaying various rankings.

In the embodiment, under the control of the Web server 20, some races in the Internet Grand Prix are held once a week in the horse racing game site. For example, five races are held every Friday night. All the players using the respective player terminals 30 can participate in these races. Further, the information on the race schedule, the race results, and the like is open to the public on this week schedule page and last week's results page within the horse racing ground page shown in FIG. 10. Further, in the ranking page, the ranking of distinguished owners based on the record in the Internet Grand Prix, as shown in FIG. 11A, and the ranking of distinguished horses classified by prize money and by achievement based on the record in the arcade game machine 1, as shown in FIG. 11B and 11C, are publicly available for players to view.

7. Game Play: Step 2

A player who wants to play a game in the Internet Grand Prix accesses the entry registration page of the horse racing game site by using the player terminal 30.

FIGS. 12(*a*) to (*g*) are views for describing the respective screens provided by the entry registration page to be displayed on the display unit 35 when a player views the entry registration page using the player terminal 30. When the player has access to the entry registration page by using the player terminal 30, the initial screen shown in FIG. 12(*a*) appears on the display unit 35 first. In this initial screen, an owner registration button for going to an owner registration screen for registering an owner and an entry registration button for going to a registration confirmation screen for confirming the previous entry before actually performing the entry registration are prepared.

For owner registration, a player who takes part in the Internet Grand Prix for the first time operates a mouse forming the above input unit 34, and clicks the owner registration button on the initial screen. Thus, the owner registration screen shown in FIG. 12(*b*) appears on the display unit 35. On this owner registration screen, using a keyboard forming the above input unit 34, the player inputs the player's e-mail address which allows the Web server 20 to make contact with the player, the owner name, and an access password which will be required in the future in order to identify the player when he or she joins a game. Having finished inputting predetermined items, the player clicks the send button displayed on the owner registration screen. Thus, the individual input items are supplied to the communication interface 31 by the control unit 32 executing the communication program, and are further supplied to the Web server 20 through the communication network 40.

In the Web server 20, the input items received through the communication interface 21 are stored in the owner registration database of the database ROM 22, with the owner name associated with the access password and the e-mail address, according to the control unit 23 executing the owner registration program stored in the program ROM 24. When the registration processing is finished, the entry registration screen shown in FIG. 12(*d*) is supplied to the player terminal 30.

A player who has already completed the owner registration clicks the entry registration button on the initial screen. Thus, the registration confirmation screen shown in FIG. 12(*c*) appears on the display unit 35. This registration confirmation screen is the same as the owner registration screen shown in FIG. 12(*b*), except that it includes no row for inputting the e-mail address. Similarly to the case of the owner registration screen, after input of the owner name and the access password, these input items are sent to the Web server 20 by clicking the send button. According to the control unit 23 executing the registration confirmation program stored in the program ROM 24, after receiving the input items, the Web server 20 reads out the access password from the owner registration database of the database ROM 22, based on the received owner name, so to compare it with the received password, and when it agrees with the received password, the Web server 20 supplies the entry registration screen shown in FIG. 12(*d*) to the player terminal 30. On the other hand, when it does not agree, it supplies a message such as "wrong password" to the player terminal 30.

The entry registration screen shown in FIG. 12(*d*) is displayed on the display unit 35 of the player terminal 30 of a player who has finished the owner registration or the registration confirmation. The player first clicks his or her own horse displayed on the entry registration screen. In the case of the first play, a player clicks the horse registration button on the horse information screen shown in FIG. 12(*e*). In the case of joining a race by using a horse that has been registered once, or in the case of training the horse again, the player clicks the horse selection button.

Figure 13:
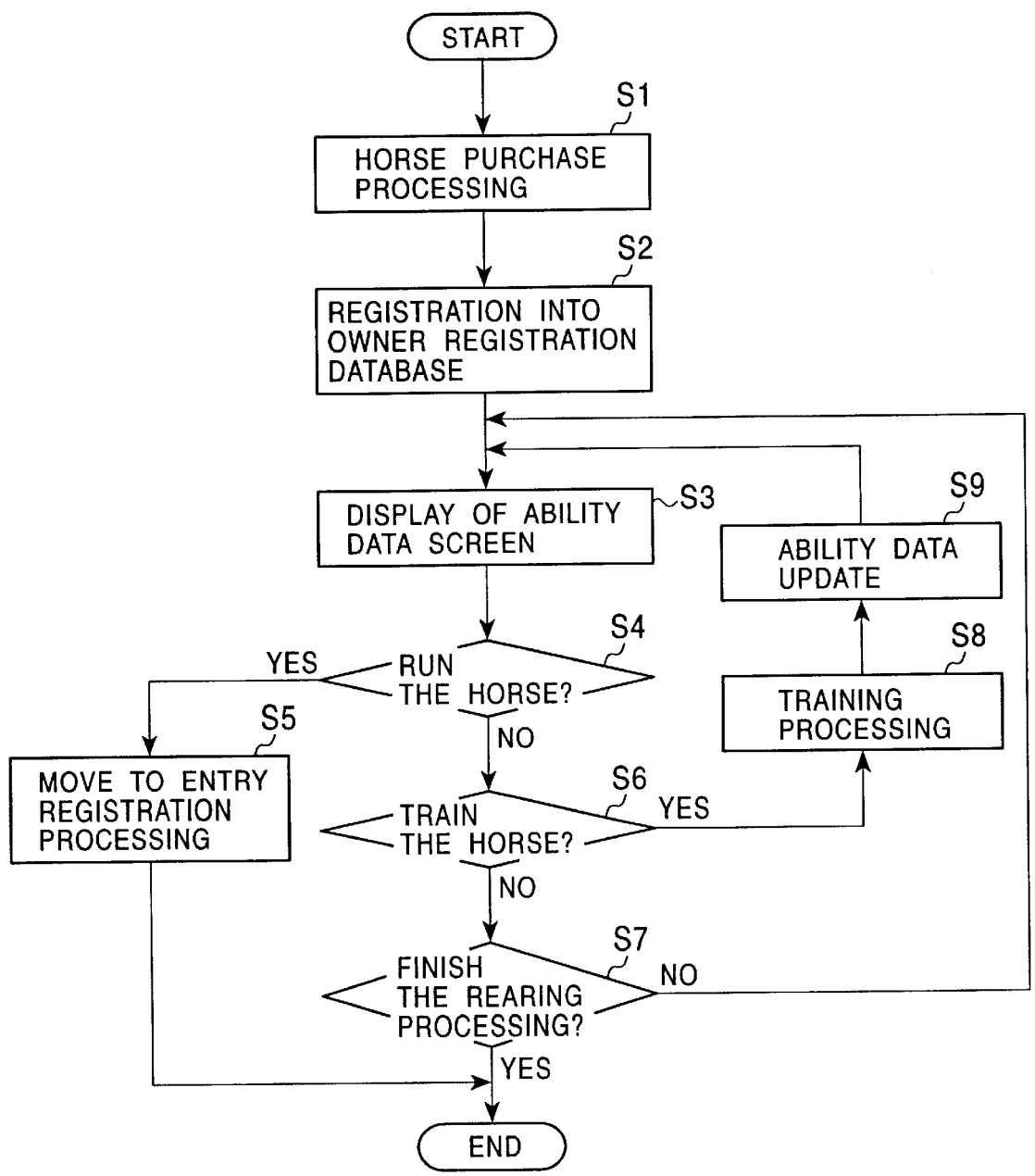
FIG. 13 is a flow chart showing one example of the training processing by a control unit executing a training program in the above Web server.

FIG. 13 is a flow chart showing an example of the training processing according to the control unit 23 executing a training program that is a part of the game executable program to be executed when the horse registration button is clicked on the horse information screen. Initially, the control unit 23 at first performs horse purchase processing in which a player purchases a horse (S1). In the horse purchase processing, a purchase horse selection screen (not illustrated) is displayed on the display unit 35 of the player terminal 30. Various ability data of a plurality of horses that a player can purchase is displayed on this purchase horse selection screen. By viewing this screen, the player selects a horse he or she wants to buy and inputs the necessary information such as the horse's name and the like. This information is sent from the player terminal 30 to the Web server 20, and the information such as the various ability data of the selected horse is stored in the owner registration database of the database ROM 22 as the player data for the player (S2).

After finishing the registration of the purchased horse, the control unit 23 performs the display processing for displaying an ability data screen (not illustrated) showing the ability data of the horse on the display unit 35 of the player terminal 30 (S3), hence prompting the player to decide whether the horse's entry for the Internet Grand Prix race should be performed or not (S4). When the horse's entry for the race is selected, this step moves to the entry registration processing described below (S5).

On the other hand, when entry into the race is not selected, the control unit 23 prompts the player to select whether the player should train the horse or not (S6). When no training is selected, a player is asked whether he or she finishes the training processing or not (S7), and when the player doesn't finish the training processing, the process returns to S3 above where the ability data screen is again displayed. On the other hand, when training is selected, the control unit 23 performs the training processing for training the horse so as to improve the ability data (S8). In this training processing, it performs, for example, display processing for displaying a stable selection screen (not illustrated) on the display unit 35 of the player terminal 30, and this enables the player to select a stable for use in training the horse from three kinds of stables displayed on the screen: a normal stable, a stamina stable, and a speed stable. In this case, if selecting the stamina stable, the horse can be reared to be a long-distance horse; if selecting the speed stable, it can be reared to be a short-distance horse; and if selecting the normal stable, it can be reared to be a horse of balanced ability which leans towards neither the long-distance nor the short-distance type.

After finishing this training processing, the ability data of the horse stored in the above owner registration database is updated to the ability data improved up and down through the training processing (S9). Thereafter, it returns to S3 again, where the ability data screen is displayed.

When a player clicks the horse selection button on the horse information screen shown in FIG. 12(*e*), the above control unit 23 controls the display unit 35 of the player terminal 30 to display the information of the player's horse stored in the above owner registration database, hence prompting the player to select a horse to use. When the horse is selected by a player, the ability data screen of the selected horse is displayed on the above display unit 35, similarly to S3 shown in FIG. 13. The transition processing is the same as in clicking the above horse registration button.

After selecting the horse, the name of the horse, the lifetime prize money won, the overall achievement, the GI race where the horse won the championship in the Internet Grand Prix, and the like are displayed on the above entry registration screen, as shown in FIG. 12(*d*). When a player registers his or her entry for the Internet Grand Prix, the player clicks the entry button on the entry registration screen. In this way, according to the control unit 32 executing the communication program, an entry registration application to the effect of his or her entry for the race is supplied to the communication interface 31, and is then sent to the above Web server 20 through the above communication network 40.

In the Web server 20, based on the above entry registration application, the control unit 23 determines whether the horse concerned with the entry registration application is permitted to join the race or not. In this determination, for example, it determines whether the player has already registered his or her entry for the Internet Grand Prix concerned with this entry registration. As for a player permitted to join the race, a race selection screen shown in FIG. 12(*f*) showing the races in which the player's own horse participates appears on the display unit 35 of the player terminal 30. Here, as for a race which permits only the horses satisfying the conditions that the number of winning GI races is a predetermined number or more, the lifetime prize money won is a predetermined amount or more, and that the horse won the championship in a predetermined GI race, etc., the above race selection screen doesn't appear, except for at the entry registration time of a horse satisfying these conditions.

Since each race in this embodiment contains 18 racing horses, the maximum permitted number of player entries for each race is 18 horses. Therefore, when a player has already registered 18 horses' entries for a race, another player's entry for the race is rejected even if a horse concerned with the entry registration application satisfies the race condition.

When a player views the race selection screen of FIG. 12(*f*) and decides in which race he or she wants his or her own horse to run, the player clicks and selects the box where the race is displayed, and clicks the send button. Thus, the desired race data is supplied, according to the control unit 32 executing the communication program, through the communication interface 31, and sent to the above Web server 20 through the above communication network 40. Thus, the entry registration of a player's own horse is performed.

8. Viewing a Race: Step 3

After a predetermined deadline for the entry registration, the control unit 23 executing the game executable program stored in the program ROM 24 of the above Web server 20 starts the Internet Grand Prix at a scheduled time, according to the race schedule stored in the database ROM 22. Each race held in this Internet Grand Prix is open to the public in real time on the race viewing page prepared in the horse racing ground page shown in FIG. 10. Not only players who have registered entries for the Internet Grand Prix race but also all people who gain access to this race viewing page can enjoy the race that is open to the public on this page.

Figure 14:
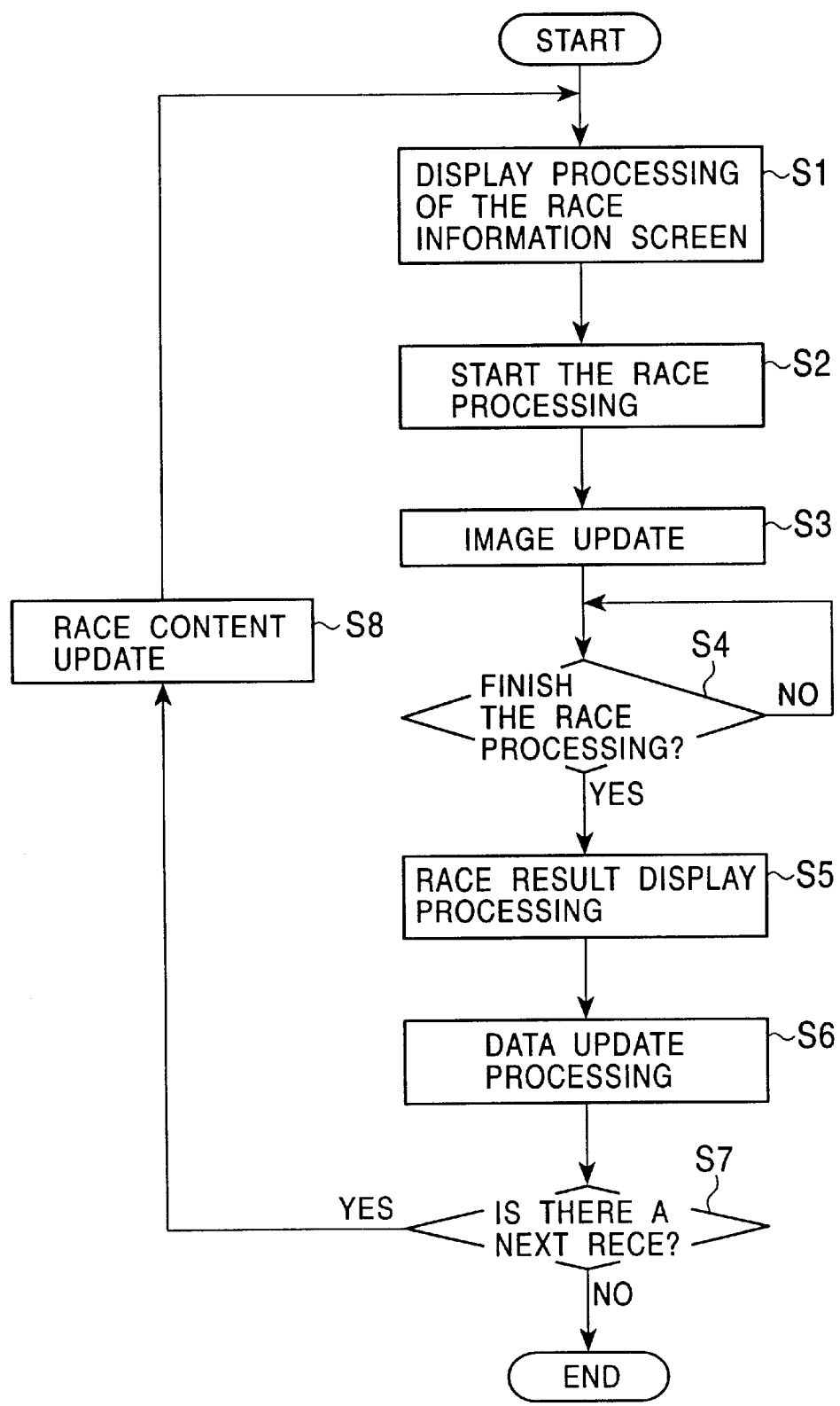
FIG. 14 is a flowchart showing a control operation of a control unit executing a game executable program in the above Web server.

FIG. 14 is a flow chart showing the game progress control of the Internet Grand Prix, according to the control unit 23 executing the above game executable program. For each race, this control unit 23 sequentially performs the race processing for running the horses entered the race, the race result display processing for displaying the order of arrival in the race, and the data update processing for updating the content of the owner registration database of the above database ROM 22 based on the race result. In the first Internet Grand Prix, five races are held, and the respective races are sequentially performed about every two minutes, including the race result display processing.

Figure 16:
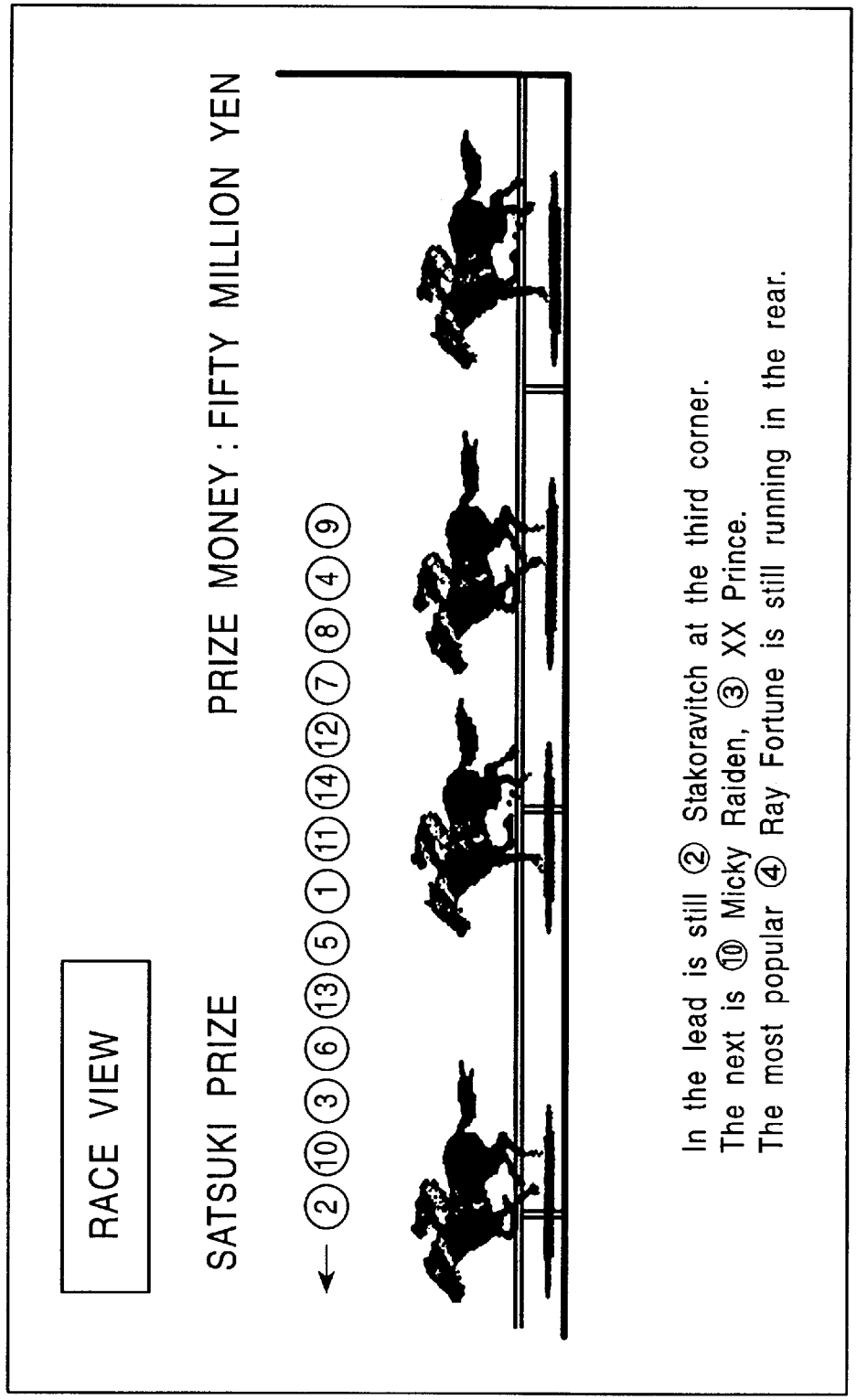
FIG. 16 is a schematic view showing one example of a race screen shown at the above race viewing page, during the race.

The above control unit 23 executes the display processing for displaying the race information screen shown in FIG. 15 on the race viewing page (S1), and provides players and the like with information about the next race. At the predetermined time in the above race schedule, it performs the race processing for realizing images and sound displayed on the above race viewing page and starts the race (S2). During the race, a race screen shown in FIG. 16 is updated every five seconds or so by way of the above race processing (S3), hence generating the feeling of being at a live performance, together with sound such as cheering. These images are downloaded to the player terminal 30 through the communication network 40 and displayed on the display unit 35 thereof.

When the race is finished (S4), the above control unit 23 performs the race result display processing for displaying the race result on the above race viewing page (S5), and a race result display screen shown in FIG. 17 is displayed on the display unit 35 of players and the like who are watching the race. On this race result display screen, the order of arrival of the race is displayed. Then, the above control unit 23 performs the data update processing of the arrival order of the respective horses together with various information of the respective horses (S6), and the history information such as the race record of the respective horses is stored in the above owner registration database.

Upon completion of the above processing, the above control unit 23 determines whether or not there is a subsequent race (S7). When there is a subsequent race, it changes the data of the race content to that of the next race content (S8), and returns to S1 above where it performs the race processing, the race result display processing, and the data update processing for the next race, in the same way as the above. When all the races are finished and it determines that there are no races left (S7), the Internet Grand Prix is finished.

9. Obtaining Password: Step 1

In the above arcade game machine 1, a password for using a horse which a player reared in the Internet Grand Prix can be obtained on condition that the player's horse has to win the championship in the GI race three times and the more in the Internet Grand Prix. A player owning a horse satisfying this condition can retire the horse by clicking the retire button displayed on the entry registration screen shown in FIG. 12(*d*). When this retire button is clicked, a retire screen shown in FIG. 12(*g*) appears on the display unit 35 of the player terminal 30. On this retire screen, the name of a distinguished horse to be retired (XX Bryan) and the password are displayed. Then, a player can obtain the password by making a note of the displayed password in a memo or by printing it out.

The trained object information corresponding to the above password includes the retirement date as the date information, the output sequence as the information on a sequence of password outputs in every day, the player name, the horse name code, the winning GI race, the total record, the speed ability and the stamina ability at the height of fame as the training result information, the lifetime prize money won as the acquired information, and the check code. The retirement date is the date when the player of the horse obtained the password. The output sequence is a number specifying a sequence of password outputs in the Internet Grand Prix on the same retirement date. The check code is obtained by replacing the code data indicating each information before replacement with a character string, with a character string of an arithmetic result calculated by a predetermined arithmetic expression. As for the other information, the information stored in the above owner registration database is used.

Though the above password includes the retirement date and the output sequence so as not to supply the overlapped password to a plurality of players, it may include a serial number that is the information on the serial number of password outputs in the Internet Grand Prix when it doesn't include the retirement date.

This embodiment is constituted in that the speed and stamina ability at the height of fame is used as the ability data for deciding the ability of a horse in the Internet Grand Prix. The speed ability at the height of fame and the like can be obtained by reading the ability data in the best condition in the past, from the history information of the past ability data stored in, for example, the flash memory 106 or the SRAM 105 that is the storage medium of the trained object information. Alternatively, the highest ability data in the best condition may be stored in the SRAM 105 or the flash memory 106. If any higher ability data is obtained, the ability data is updated to this.

Since, in the Internet Grand Prix, a password is to be given to a horse at retirement, if the ability data were at a time of giving the password, a player would have to play a game with a horse of lower ability in the arcade game machine 1. In this embodiment, however, the ability data of a horse is that one at the height of fame, and therefore, the ability data in the best condition can be reflected in a race in the arcade game machine 1.

In this embodiment, although the display unit 35 of the above player terminal 30 is used as a password output device that is the output device of the trained object information and the trained object information is supplied by way of a password, it is not restricted to this structure as long as the trained object information can be supplied so as to be used in a game by the arcade game machine 1. For example, when an FD drive is provided in the arcade game machine 1 as a trained object information receiving device, the trained object information is sent to the player terminal 30 as electronic data, the data is stored in the FD, and the FD is installed in the FD drive of the arcade game machine 1, thereby transferring the above trained object information to the arcade game machine 1. When the trained object information is written into a portable storage medium, such as an FD, as electronic data, the electronic data should be stored according to a format readable by the arcade game machine 1.

10. Entry Application: Step 5

A player who gained a password in the above Step 4 carries the password to the arcade game machine 1 installed in a nearby game center. In order to play a game in the above arcade game machine 1, a player purchases some necessary medals, inserts the medals into the medal inlet 13 shown in FIG. 6, and takes part in the game. A player who inserts the medals starts playing the game according to the game screen shown on the display 11.

Figure 18A:
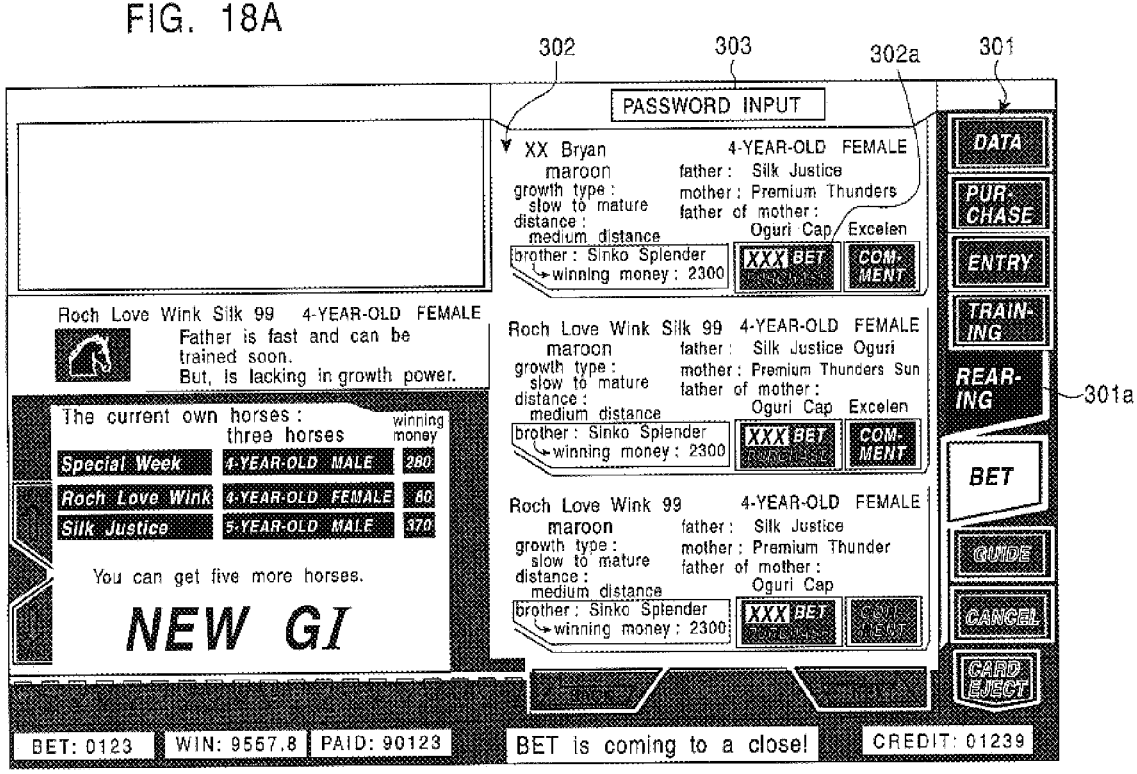
FIG. 18A is a schematic view showing a horse selection screen displayed on a display in the above arcade game machine.

The player operates the touch panel 12 on the display 11 so as to display the horse selection screen shown in FIG. 18A. On the horse selection screen, a mode switching portion 301 for switching the mode of the game play (betting ticket purchase mode or horse training mode) in the station 3 is displayed at the right end portion of the screen. A training mode tab 301a of the mode switching portion 301 is provided with a data button for displaying the data of the player's horse, a horse purchase button for purchasing a horse, an entry button for running a horse, and a training button for training a horse.

When the player plays a game in the arcade game machine 1 by using the above password, he or she selects the horse purchase button on the horse selection screen. Thus, in the station control unit 200, the horse purchase processing in which a player purchases a horse is executed and information about three horses that are candidates for the purchase is displayed on a purchase candidate horse display portion 302 at the right side of the screen. Here, the player selects a password input button displayed on the upper side of the screen of the purchase candidate horse display portion 302. Thus, the password input screen shown in FIG. 19 appears on the display 11.

On the password input screen, the player operates the touch panel 12 as a trained object information receiving device, so as to enter the password obtained in the Internet Grand Prix and press the OK button. This password is sent from the touch panel 12 to the station controller 201. The station controller 201, upon receipt of the password, transfers the password to the main control unit 100.

Figure 20:
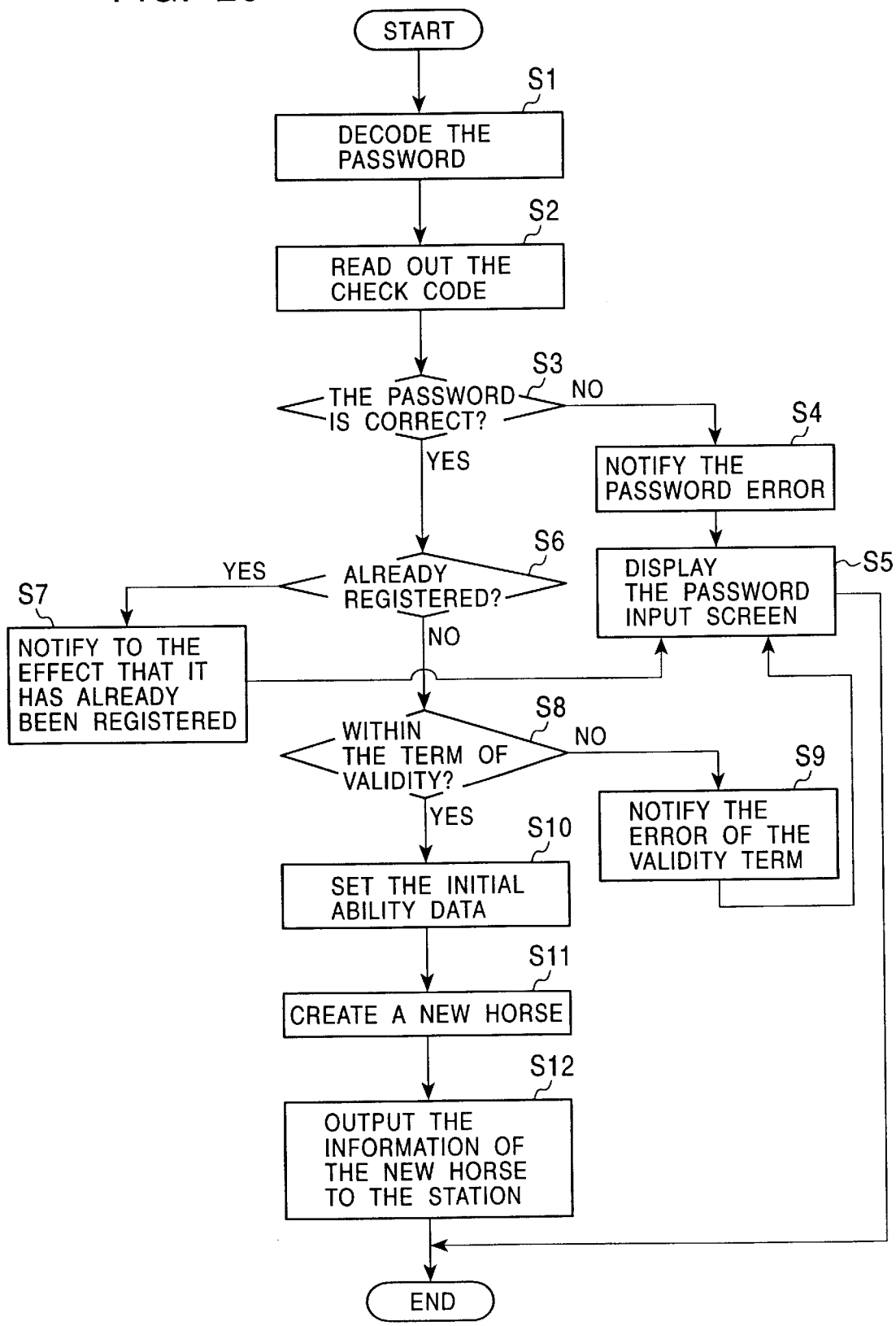
FIG. 20 is a flow chart showing a flow of control of a main control unit executing new horse training processing in the above arcade game machine.

FIG. 20 is a flow chart showing a flow of control of the main controller 101 in the main control unit 100 which creates a new horse based on the above password. The main control unit 100 first decodes the password and obtains various information corresponding to the password such as the ability data and the like, through the main controller 101 executing a password decode program stored in the ROM 107 as a password decoding device (S1). The obtained information is initially stored in the SRAM 105. A check code is read out (S2) from the decoded password by the main controller 101 executing a password determination program functioning as a password determining device, and whether the password is right or wrong is determined based on the check code (S3). In this determination, the main controller 101 inversely calculates the read-out check code according to the arithmetic expression used in the control unit 23 of the Web server 20, and the code data obtained thus is compared with the code data such as the retirement date and the like corresponding to the password. In this comparison, when they are in agreement, the password is determined to be right, and when they do not agree, it is determined to be wrong.

In this determination of the password, when the password is determined to be wrong, a password error notice is returned to the station 10 that is the sending source, the notice is displayed on the display 11 (S4), and the password input screen is displayed again (S5). When it is determined to be right, the main controller 101, working as an entry deciding device, determines whether the horse according to the password has been already registered in the player data stored in the flash memory 106 (S6). In this determination, when it is determined to have been already registered, a notice to the effect that the horse has been already registered is sent to the display 11 of the station 10 that is the sending source (S7), and the password input screen is displayed again (S5).

While, when it is determined to have not been registered, the main controller 101, working as the entry deciding device, determines whether the retirement date included in the password is within the term of validity or not (S8). In this embodiment, since the term of validity of a password is set as 90 days, in this determination, it determines whether the retirement date is more than 90 days earlier than now. In the above determination, when the retirement date is determined to be more than 90 days earlier, a validity error notice is sent to the display 11 of the station 10 that is the sending source (S9), and the password input screen is displayed again (S5).

The training result information of the ability data of the horse concerned with the password can be used as the ability data of the horse in the arcade game machine 1 without modification. In this case, however, since the cost of rearing a horse is very different between a player who reared a horse only in the arcade game machine 1 and a player using a password, it is assumed that almost all the players will rear their own horses in the Internet Grand Prix, to improve their ability, before playing a game in the arcade game machine 1. If this situation occurs often, there is a fear of dramatically reducing the sales in a game center and the like provided with the arcade game machine 1. Then, in the embodiment, the ability data of a horse reared in the Internet Grand Prix is used as the initial ability data that is the initial training result information of a purchased horse in a game in the arcade game machine 1.

In determining the term of validity, when the retirement date is determined to be within 90 days, the initial ability data that is the initial training result information is set based on the respective ability data extracted from the password, by the main controller 101 executing the initial setting program working as an initial training result information deciding device (S9). The numeric value of the initial ability data becomes higher according as the numeric value of the ability data of a horse reared in the Internet Grand Prix becomes higher, and the ability data varies among the horses of the respective players. Then, a new horse having the initial ability data is created (S10). Since the password in the embodiment includes only the speed ability data and the stamina ability data as the training result information, only the speed ability data and the stamina ability data of a new horse are reflected as the initial ability data, and the other ability data is the same as the data of an ordinary purchased horse. The data of the new horse thus created is sent to the station controller 201 of the station 10 (S11).

In the station controller 201, the received data of the new horse is processed to be displayed in the purchase candidate horse display portion 302 on the horse selection screen shown in FIG. 18A, and the new horse is listed as a candidate horse for purchase. By pressing the purchase button 302a of the new horse, a player can get the new horse which reflects the ability data of a horse reared in the Internet Grand Prix. The information of the purchased new horse is stored in the player data in the RAM 203.

After purchasing the new horse, a player selectively enters the necessary items such as the name of the new horse and the like according to the game screen displayed on the display 11. This processing is the same as the processing to be performed after purchasing a horse in the regular way. After finishing this processing, a player presses the training button shown in FIG. 18A displayed on the display 11, so to train the purchased new horse. Thus, the training processing is performed by the station controller 201 executing the training program working as a training device. Though this training processing is the same as the breaking processing to be performed by the control unit 23 of the Web server 20, more parameters are varied by this training processing than the parameters varied in the Internet Grand Prix, which enables complicated game development.

Figure 18B:
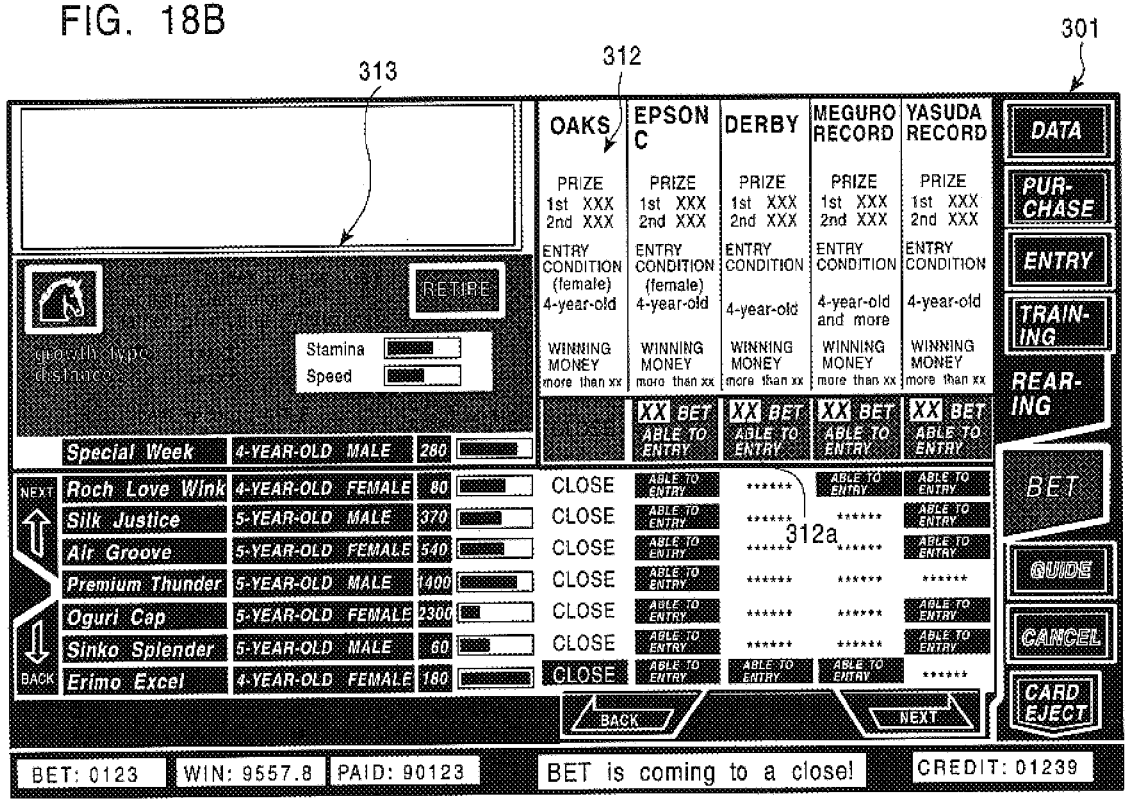
FIG. 18B is a schematic view showing a race selection screen shown in the above display.

When running the new horse in a race after training the new horse with the ability data of the horse reared in the Internet Grand Prix reflected therein, a player presses the entry button in the mode switching portion 301 at the right end portion on the screen. Thus, the station controller 201 executing the race selection program as the entry deciding device accepts the entry application through the touch panel 12 and displays the race selection screen shown in FIG. 18B on the display 11. The player's own horse display portion 313, where a list of the horses owned by a player is displayed, is provided on the left side of the race selection screen, and a horse to run in a race is selected from the list by the player. A race selection portion 312, where the names of the races are displayed, is provided on the right side of the race selection screen. In this race selection portion 312, the respective names of the races as well as the prize money when winning the first or the second prize in each race and the entry conditions are displayed.

On the lower side of the race selection portion 312, four types of statements are displayed: "registered" indicating that the selected horse has already been registered for the race; "possible to run in the race" indicating that the horse can run in the race; "mismatched" indicating that the horse does not satisfy the racing conditions as the entry conditions; and "closed" indicating that the entry is closed. Thus, a player can confirm whether the respective horses can run in the respective races or not. As for the race in which the selected horse can run, amount of the bet to be paid by a player is also displayed as a condition of the entry registration.

The station controller 201 determines whether the horse satisfies the entry conditions such as the number of championships in the GI races, according to the race selection program, before displaying the race selection screen. The determination result is displayed on the race selection screen like "possible to run in the race" or "mismatched".

When a player presses the button 312a of a race in which a player wants the selected horse to run, the entry of the selected horse for the race is registered. A jockey selection screen (not illustrated) appears on the display 11. According to the screen, a player performs a predetermined procedure such as selecting a jockey and the like. After finishing the entry registration in this way, various data on the horse concerned with this entry registration is sent to the main controller 101.

The main controller 101 reflects the data of the above horse in the race, according to the game advancing program, and while controlling the field controller 102, the illumination controller 103, the sound controller 104 and the like, it develops the race on the field 2.

11. Second Embodiment

Here, a description will be made in the case where the present invention is applied to the same game system as that of the above-mentioned first embodiment (hereinafter, this embodiment is referred to as the "second embodiment"). This embodiment is substantially different from the above first embodiment in that the Web server 20 and the arcade game machine 1 forming the game system are connected through the communication network 40 that is a network. Hereafter, only the structure and the operation which differ from those of the above first embodiment will be described.

FIG. 21 is a schematic view of the whole game system according to this embodiment. The game system comprises many arcade game machines 1 as commercial game machines similarly to the above first embodiment, a Web server 20 as a network game apparatus for performing the Internet Grand Prix, player terminals 30 as client devices connectable to the Internet, and a communication network 40 formed by a public telephone line, a dedicated telephone line, a cable television line, a wireless communication line, and the like, that is a network for connecting these units. The arcade game machine 1 and the player terminal 30 are respectively connected to the Web server 20 through the communication network 40, which enables bidirectional data communication.

When a player retires his or her own horse in the Internet Grand Prix, the password is displayed on the display 11 of the display unit 35 of the player terminal 30, similarly to the above first embodiment. The content of this password, however, doesn't include the training result information such as the speed ability and the stamina ability at the height of fame, nor the other trained object information such as the player's name, the horse code, and the like. Instead of them, it includes only the check code, and the ID code, and the horse name code as the specific information for specifying the horse. Since this password includes a much smaller amount of information than that of the above first embodiment, the number of the characters in the password can be reduced.

In the above arcade game machine 1, when a player plays a game with this password, he or she enters the password on the password input screen shown in FIG. 19, similarly to the above first embodiment. Upon receipt of this password, the station controller 201 sends the password to the main controller 101.

Although the main controller 101 of the above first embodiment decodes the password to extract the ability data included in the password, the ability data of a horse corresponding to the password is obtained from the Web server 20, based on the ID code and the horse name code obtained by decoding the password, in this embodiment. More specifically, the main controller 101, upon receipt of the password, executes a predetermined communication program and sends a data request requesting the ability data, etc. of the horse, to the Web server 20. The control unit 23 of the Web server 20, upon receipt of the data request, reads out the ability data, etc. stored in the owner registration database in the database ROM 22, based on the ID code and the horse name code included in the data request. The ability data and the like are sent to the arcade game machine 1 that is the sending source of the data request.

In this structure, the amount of information of the trained object information supplied from the Web server 20 to the arcade game machine 1 is not as restricted as the amount of information of the password. Accordingly, the training result information for use in the arcade game machine 1 can include the other training result information that has been used in the Internet Grand Prix, in addition to the speed ability and the stamina ability at the height of fame.

The processing thereafter in the main controller 101 that obtained the ability data and the like of the horse thus reared in the Internet Grand Prix is the same as that in the above embodiment. In the case of using the other training result information in addition to the speed ability and the stamina ability at the height of fame, the training result information in the Internet Grand Prix can be reflected in a game of the arcade game machine 1 more accurately than in the above first embodiment.

Various programs to be executed by the control unit 23 of the Web server 20 can be obtained in the form of a storage medium such as a CD-ROM (i.e., Compact Disc-Read Only Memory) or the like which stores the programs, in the above first embodiment and second embodiment. Various programs to be executed by the main control unit 100 and the station control unit 200 of the arcade game machine 1 can be obtained in the same way. Further, these programs can be also obtained by receiving signals sent from a computer that is a transmitting device, through a transmission medium such as the communication network 40 or the like. These signals are computer data signals embodied into predetermined carrier waves including the programs. This transmission has to send at least one of the above programs through the transmission medium. Namely, it is not necessary that all the data forming the above programs exists on the transmission medium at once. The sending method for sending a program from the computer to the other party includes the case of sequentially sending the data forming a program and the case of intermittently sending the data.

In the above first embodiment and second embodiment, though the description has been made taking an example of a game system that is a horse racing simulation game, the present invention is not restricted to this, as long as the trained object reared in the network game apparatus can be used for developing a game in the arcade game machine 1 or in a game apparatus of the home game machine. The game apparatus in the arcade game machine 1 is not necessarily a training-type game. Further, the network game executed with the Web server 20 and the game executed with the arcade game machine 1 are not necessarily of the same type. Namely, various ability data that is the training result information of a character reared with the Web server 20 executing a role playing game may be passed to the arcade game machine 1 executing the horse racing simulation game, and the various ability data may be converted into various ability data of a racing horse in the horse racing simulation game, thereby advancing a race. Here, "training" in the present invention includes the concept that the ability of every trained object appearing in a game is improved or that the ability is controlled.

In the above first embodiment and second embodiment, though the Internet Grand Prix is executed according to the control unit 23 of the Web server 20, one of the game executable programs may be provided on the side of the player terminal 30 that is the client device, so as to share the processing therebetween. Furthermore, one or all of the respective processing performed by the arcade game machine 1, the Web server 20, and the player terminal 30 may be performed in the other device forming the above game system.

According to the first aspect of the present invention, the training result information in a network game is used as parameters inherent in a trained object for use in a game by a game apparatus, thereby enabling game play in a game apparatus such as an arcade game machine and the like, based on the training result information that is the information on the training result of a trained object reared by a player in a network game. Accordingly, the player can enjoy a more complicated and sophisticated game by using the trained object in the network game.

According to the second to twenty sixth aspects of the present invention, it enables game play in a game apparatus such as an arcade game machine and the like, based on the training result information that is the information on the training result of a trained object created by a player in a network game. Accordingly, the player can enjoy a more complicated and sophisticated game by using the trained object of the network game.

In particular, according to the third and thirteenth aspects of the present invention, it is possible to transfer the training result information, even if the training result information has a large amount of information, from a network game apparatus to a game apparatus, without burdening a player, so that the training result information may be reflected in a game, thereby enabling more complicated and sophisticated development of a network game.

Further, according to the fourth and fourteenth aspects of the present invention, it is not necessary that the training result information within a network game apparatus is passed to a game apparatus separately from the trained object information. Accordingly, the cost of the whole game system can be reduced.

According to the fifth and fifteenth aspects of the present invention, a player can make use of the training result information of the best condition in a network game, for a game by a game apparatus. Therefore, it is possible for a player to play a game together with the other players, by the best use of the training result of the player's trained object.

According to the sixth and sixteenth aspects of the present invention, it is possible to transfer the trained object information in a network game apparatus to a game apparatus by a comparatively easy method such as by way of a password.

Especially, according to the seventh and seventeenth aspects of the present invention, use of an invalid password can be prevented, thereby advantageously securing fairness of a network game.

According to the eighth and nineteenth aspects of the present invention, it enables detailed setting, such as setting of validity, for the trained object information.

According to the ninth and tenth aspects of the present invention, it is possible to prevent the output of the same trained object information between different players, even if the different players use exactly the same trained object.

According to the eleventh and twenty second aspects of the present invention, it is possible to embody various ideas such that the information obtained in a network game can be defined as conditions for playing with a game apparatus, or that the same information can be reflected in the ability of a trained object, or the like.

According to the eighteenth and twenty first aspects of the present invention, when a player or the player's trained object satisfies predetermined entry conditions, its entry for a game in a game apparatus is permitted, thereby embodying various ideas such as preventing invalid entry and the like.

Especially, according to the twentieth aspect of the present invention, it is possible to prevent a duplicate entry of the same trained object for the same game, thereby enabling the game to advance with various kinds of trained objects.

According to the twenty first aspect of the present invention, it is possible to prevent a duplicate entry of the same player for the same game, thereby enabling the game to advance with many players. Further, when some privilege is given to a champion in a game system, it is possible to prevent fraud such as one player's dominance in a game for gaining the privilege, thereby realizing a fair game.

According to the twenty third aspect of the present invention, a trained object in a game apparatus can be further trained in the game apparatus with its data in a network game reflected there, thereby promoting use of the game apparatus.

It is contemplated that numerous modifications may be made to the game system, the network game apparatus, the game apparatus, the client device, and the recording medium, such as a computer readable medium, having recorded a program for controlling the network game apparatus, of the present invention without departing from the spirit and scope of the invention as defined in the following claims.

What is claimed is:

1. A game system, comprising
   a network game apparatus, connected to a network and operable to provide a first game using the network to rear a trained object;
   a client device, connected to the network game apparatus via the network to play the first game to generate first information including result information regarding a training result of the trained object in the first game; and
   a commercial game apparatus, operable to provide a second game using the trained object, wherein:
   the network game apparatus comprises:
   a storage, operable to store the first information; and
   a supplier, operable to supply second information, which is at least a part of the first information, to the client device, the second information being to be recorded on a carriable medium; and
   the commercial game apparatus comprises:
   a receiver, operable to receive the second information from the carriable medium;
   a reproducer, operable to reproduce the result information based on the second information received by the receiver; and
   an executer, operable to execute the second game based on the result information reproduced by the reproducer.

2. The game system as set forth in claim 1, wherein,
   the commercial game apparatus is connected to the network game apparatus via the network; and
   the reproducer acquires the result information from the storage based on the second information received by the receiver.

3. A network game apparatus, comprising:
   a provider, operable to provide a first game using a network to rear a trained object;
   a storage, operable to store first information including result information regarding a training result of the trained object in the first game, which is generated by a client device connected to the network game apparatus via the network; and
   a supplier, operable to supply second information, which is at least a part of the first information to the client device, the second information being to be recorded on a carriable medium and used in a second game using the trained object, which is executed by a commercial game apparatus.

4. The network game apparatus as set forth in claim 3, wherein the second information includes an identifier which identifies the result information in the storage.

5. The network game apparatus as set forth in claim 3, wherein the second information includes the result information.

6. The network game apparatus as set forth in claim 3, wherein the result information indicates a best condition of the trained object during the first game.

7. The network game apparatus as set forth in claim 3, wherein the second information is a password in which at least the result information has been encoded.

8. The network game apparatus as set forth in claim 7, wherein the password includes a check code which indicates whether the second information is authentic.

9. The network game apparatus as set forth in claim 3, wherein the second information includes date information which indicates a date that the second information is supplied to the client device.

10. The network game apparatus as set forth in claim 9, wherein the second information includes serial number information which indicates an order of the second information supplied to the client device at the date indicated by the date information.

11. The network game apparatus as set forth in claim 3, wherein the second information includes serial number information which indicates an order of the second information supplied to the client device.

12. The network game apparatus as set forth in claim 3, wherein the result information includes a result gained by the trained object during the first game.

13. A commercial game apparatus, constituting a game system together with a network game apparatus connected to a network and operable to provide a first game using the network to rear a trained object and to store first information including result information regarding a training result of the trained object in the first game, the commercial game apparatus comprising:

a provider, operable to provide a second game using the trained object;

a receiver, operable to receive second information, which is at least a part of the first information, from a carriable medium in which the second information has been recorded;

a reproducer, operable to reproduce the result information based on the second information received by the receiver; and an executer, operable to execute the second game based on the result information reproduced by the reproducer.

14. The commercial game apparatus as set forth in claim 13, wherein:

the commercial game apparatus is connected to the network game apparatus via the network;

the second information includes an identifier which identifies the result information stored in the network game apparatus; and the reproducer acquires the result information from the network game apparatus based on the identifier.

15. The commercial game apparatus as set forth in claim 13, wherein the second information includes the result information.

16. The commercial game apparatus as set forth in claim 13, wherein the result information indicates a best condition of the trained object during the first game.

17. The commercial game apparatus as set forth in claim 13, wherein:

the second information is a password in which at least the result information has been encoded; and the reproducer decodes the password to reproduce the result information.

18. The commercial game apparatus as set forth in claim 17, wherein:

the password includes a check code which indicates whether the second information is authentic; and the reproducer inspects the check code to determine whether the second information is authentic.

19. The commercial game apparatus as set forth in claim 13, further comprising an authorizer, operable to authorize a player to participate the second game in a case where the second information satisfies a predetermined requirement.

20. The commercial game apparatus as set forth in claim 19, wherein:

the second information includes date information which indicates a date that the second information is supplied to the client device;

the predetermined requirement is that the date information indicates a predetermined date.

21. The commercial game apparatus as set forth in claim 19, wherein:

the second information includes serial number information which indicates an order of the second information supplied to the client device; and the predetermined requirement is that the serial number information indicates that a predetermined order.

22. The commercial game apparatus as set forth in claim 19, wherein the predetermined requirement is that the second information indicates that the player is not identical with a player who has been playing the second game.

23. The commercial game apparatus as set forth in claim 19, wherein the predetermined requirement is that the second information indicates that the player is not identical with a player who has been playing the first game.

24. The commercial game apparatus as set forth in claim 13, wherein:

the result information includes a result gained by the trained object during the first game; and the executer utilizes the result in the second game.

25. The commercial game apparatus as set forth in claim 24, wherein:

the second game includes a game for training a new trained object; and the executer establishes an initial condition of the new trained object based on the result.

26. A client device, constituting a game system together with a network game apparatus connected to the client device via a network and operable to provide a first game using the network to rear a trained object, and a commercial game apparatus operable to provide a second game using the trained object, the client device comprising:

an executer, operable to execute the first game to store first information regarding a training result of the trained object in the first game, into the network game apparatus; and a receiver, operable to receive second information from the network apparatus, which is at least a part of the first information and is to be recorded in a carriable medium and used in the second game.

27. A computer-readable recording medium, having recorded a program causing a computer in a network game apparatus to execute steps of:

providing a first game using a network to rear a trained object;

storing first information including result information regarding a training result of the trained object in the first game, which is generated by a client device connected to the network game apparatus via the network; and supplying, to the client device, second information which is at least a part of the first information and is to be recorded in a carriable medium and used in a second game using the trained object, which is executed by a commercial game apparatus which constitutes a game system together with the network game apparatus and the client device.

28. A computer-readable recording medium, having recorded a program causing a computer in a commercial game apparatus, which constitutes a game system together with a network game apparatus connected to a network and operable to provide a first game using the network to rear a trained object and to store first information including result information regarding a training result of the trained object in the first game, to execute steps of:

providing a second game using the trained object;

receiving second information, which is at least a part of the first information, from a carriable medium in which the second information has been recorded;

reproducing the result information based on the received second information; and executing the second game based on the reproduced result information.

29. A computer-readable recording medium, having recorded a program causing a computer in a client device, which constitutes a game system together with a network game apparatus connected to the client device via a network and operable to provide a first game using the network to rear a trained object, and a commercial game apparatus operable to provide a second game using the trained object, to execute steps of:

executing the first game;

storing first information regarding a training result of the trained object in the first game, into the network game apparatus; and receiving second information from the network game apparatus, which is at least a part of the first information and is to be recorded in a carriable medium and used in the second game.

* * * * *